United States Patent
Oh et al.

(10) Patent No.: US 11,671,982 B2
(45) Date of Patent: Jun. 6, 2023

(54) METHOD, APPARATUS, AND SYSTEM FOR ALLOCATING RESOURCES IN WIRELESS COMMUNICATION SYSTEM

(71) Applicant: Samsung Electronics Co., Ltd., Suwon-si (KR)

(72) Inventors: Jinyoung Oh, Suwon-si (KR); Hyunseok Ryu, Suwon-si (KR); Sungjin Park, Suwon-si (KR); Jonghyun Bang, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 17/262,895

(22) PCT Filed: Jun. 19, 2019

(86) PCT No.: PCT/KR2019/007414
§ 371 (c)(1),
(2) Date: Jan. 25, 2021

(87) PCT Pub. No.: WO2020/022650
PCT Pub. Date: Jan. 30, 2020

(65) Prior Publication Data
US 2021/0168849 A1    Jun. 3, 2021

(30) Foreign Application Priority Data
Jul. 26, 2018 (KR) .......................... 10-2018-0087279

(51) Int. Cl.
*H04W 72/00* (2023.01)
*H04L 5/00* (2006.01)
(Continued)

(52) U.S. Cl.
CPC .......... *H04W 72/23* (2023.01); *H04L 5/0053* (2013.01); *H04L 5/0055* (2013.01); *H04L 27/3461* (2013.01)

(58) Field of Classification Search
CPC ............ H04W 72/1289; H04W 72/042; H04L 5/0053
See application file for complete search history.

(56) References Cited

U.S. PATENT DOCUMENTS 10,869,330 B2    12/2020 Oh et al.
2019/0149308 A1*    5/2019 Son ....................... H04L 5/0007
(Continued)

FOREIGN PATENT DOCUMENTS

WO    2017-135726 A1    10/2017

OTHER PUBLICATIONS

International Search Report dated Oct. 1, 2019, issued in an International Application No. PCT/KR2019/007414.
(Continued)

*Primary Examiner* — Ronald B Abelson
(74) *Attorney, Agent, or Firm* — Jefferson IP Law, LLP

(57) ABSTRACT

The present disclosure provides a method of performing communication according to an allocated resource domain in a wireless communication system, wherein the method includes: obtaining configuration information for control channel and data channel transmission and reception; obtaining downlink control information (DCI) including physical uplink shared channel (PUSCH) transmission slot scheduling information and at least one slot format indicator corresponding to a plurality of PUSCH transmission slots, based on the configuration information; identifying the plurality of PUSCH transmission slots based on the DCI; determining a resource domain allocated for transmission of uplink data in the plurality of PUSCH transmission slots, by
(Continued)

using at least one of the at least one slot format indicator and the DCI; and transmitting the uplink data by using the determined resource domain.

13 Claims, 15 Drawing Sheets

(51) Int. Cl.
*H04W 72/23* (2023.01)
*H04L 27/34* (2006.01)

(56) References Cited

U.S. PATENT DOCUMENTS

2019/0223199 A1* 7/2019 Park .................. H04W 72/1289
2019/0349180 A1* 11/2019 Lu ......................... H04L 5/0091

OTHER PUBLICATIONS

Written Opinion dated Jan. 26, 2021, issued in an International Application No. PCT/KR2019/007414.
LG Electronics; Discussion on resource allocation and TBS determination; 3GPP TSG RAN WG1 Meeting 90bis; R1-1717965; Discussion and decision, Agenda Item: 7.3.3.1; Oct. 3, 2017, Prague, CZ.
Oppo; Remaining issues on GC-PDCCH; 3GPP TSG RAN WG1 Meeting #93; R1-1806858; Discussion and Decision, Agenda Item: 7.1.3.1.3; May 11, 2018, Busan, Korea.
Oppo; Resource allocation for PDSCH/PUSCH; 3GPP TSG RAN WG1 Meeting 91; R1-1719973; Discussion and Decision, Agenda Item: 7.3.3.1; Nov. 18, 2017, Reno, USA.
ZTE; Remaining issues for UL data transmission procedure; 3GPP TSG RAN WG1 Meeting #93; R1-1806030 Discussion and Decision, Agenda item: 7.1.3.3.4; May 12, 2018, Busan, Korea.
CMCC; Discussion on PUSCH repetition for grant-free transmission; 3GPP TSG RAN WG1 Meeting #92bis; R1-1804103; Discussion, Agenda Item: 7.1.3.3.4; Apr. 7, 2018, Sanya, China.

* cited by examiner

METHOD, APPARATUS, AND SYSTEM FOR ALLOCATING RESOURCES IN WIRELESS COMMUNICATION SYSTEM

TECHNICAL FIELD

The present disclosure relates to a method of allocating resources in a wireless communication system.

BACKGROUND ART

In order to meet the increasing demand with respect to wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called 'beyond 4G network communication systems' or 'post long term evolution (LTE) systems'.

In order to achieve a high data rate, consideration is given to implementing 5G communication systems in millimeter wave (mmW) frequency bands (e.g., 60 GHz bands). In order to reduce propagation path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna.

Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter-bank multi-carrier (FBMC), non-orthogonal multiple access (NOMA), or sparse code multiple access (SCMA) is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

As various services may be provided with the development of wireless communication systems as described above, there is a demand for a method of smoothly providing the various services.

DESCRIPTION OF EMBODIMENTS

Technical Problem

Disclosed embodiments provide an apparatus and method for effectively providing services in a mobile communication system.

Solution to Problem

Disclosed embodiments provide a method, an apparatus, and a system for allocating resources in a wireless communication system.

Advantageous Effects of Disclosure

According to disclosed embodiments, services may be effectively provided in a mobile communication system.

BEST MODE

Figure 1:
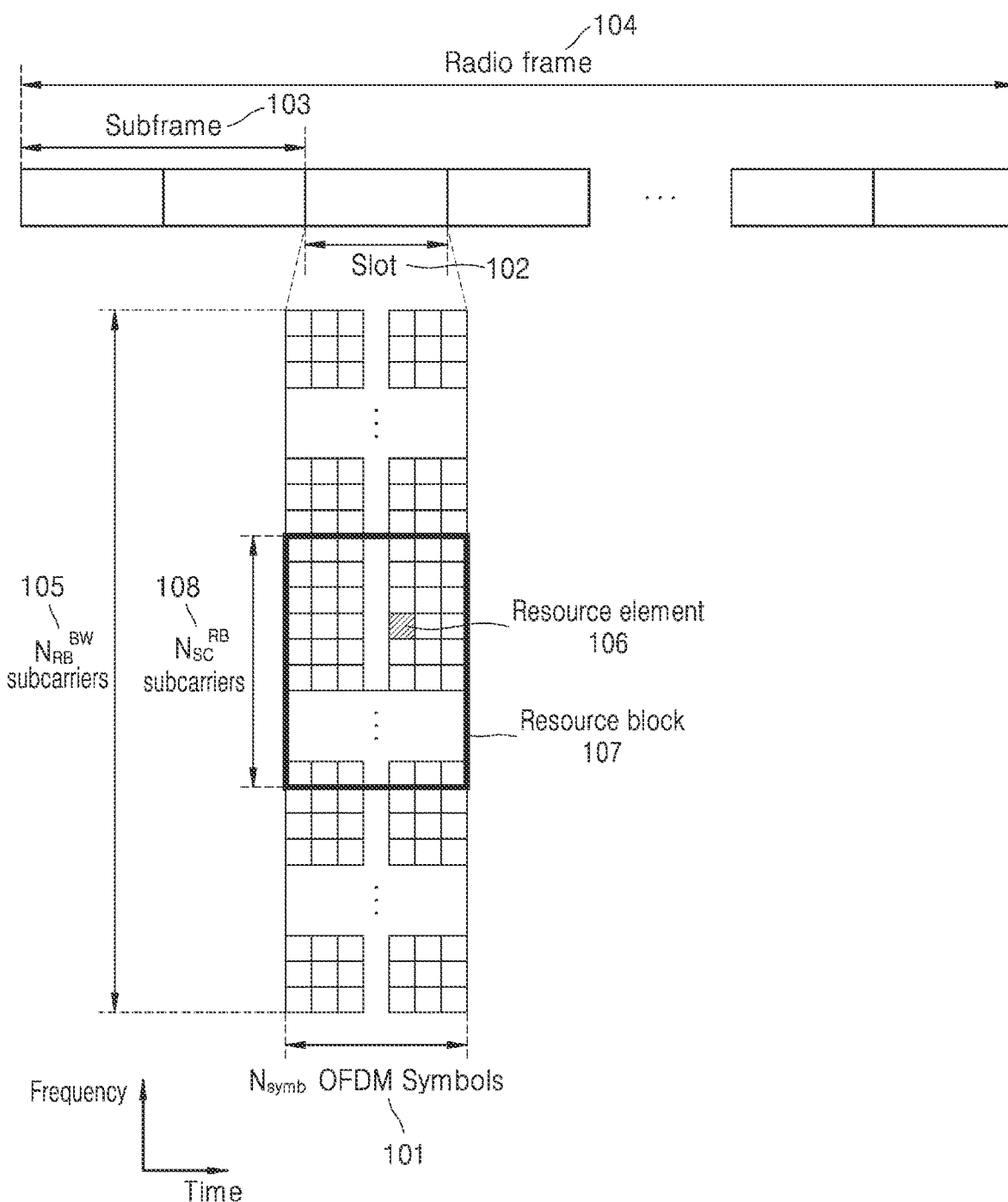
FIG. 1 is a diagram illustrating an uplink/downlink time-frequency domain transmission structure of a new radio (NR) system, according to some embodiments of the present disclosure.

According to an embodiment of the present disclosure, a method, performed by a terminal, of performing communication according to an allocated resource domain in a wireless communication system includes: obtaining configuration information for control channel and data channel transmission and reception; obtaining downlink control information (DCI) including physical uplink shared channel (PUSCH) transmission slot scheduling information and at least one slot format indicator corresponding to a plurality of PUSCH transmission slots, based on the configuration information; identifying the plurality of PUSCH transmission slots based on the DCI; determining a resource domain allocated for transmission of uplink data in the plurality of PUSCH transmission slots, by using at least one of the at least one slot format indicator and the DCI; and transmitting the uplink data by using the determined resource domain.

The DCI may include at least one of information on a number of the plurality of PUSCH transmission slots, offset information of the plurality of PUSCH transmission slots, and information on a time resource domain allocated for PUSCH transmission and a frequency resource domain allocated for PUSCH transmission.

The determining of the resource domain allocated for transmission of the uplink data in the plurality of PUSCH transmission slots, by using at least one of the at least one slot format indicator and the DCI, may include: determining an uplink symbol of the identified plurality of PUSCH transmission slots as the resource domain allocated for transmission of the uplink data; and determining a flexible symbol of the identified plurality of PUSCH transmission slots based on the at least one slot format indicator.

The determining of the flexible symbol of the identified plurality of PUSCH transmission slots based on the at least one slot format indicator may include, when the at least one slot format indicator is received through a higher layer signal, determining the flexible symbol as the resource domain allocated for transmission of the uplink data.

The determining of the resource domain allocated for transmission of the uplink data in the plurality of PUSCH transmission slots, by using at least one of the at least one slot format indicator and the DCI, may include determining the resource domain allocated for transmission of the uplink data in the plurality of PUSCH transmission slots based on the at least one slot format indicator.

The determining of the resource domain allocated for transmission of the uplink data in the plurality of PUSCH transmission slots, by using at least one of the at least one slot format indicator and the DCI, may include determining a PUSCH transmission start symbol of a first PUSCH transmission slot and a PUSCH transmission end symbol of a last PUSCH transmission slot from among the plurality of PUSCH transmission slots based on the DCI, and determining the resource domain allocated for transmission of the uplink data of remaining PUSCH transmission slots based on the at least one slot format indicator.

The determining of the resource domain allocated for transmission of the uplink data in the plurality of PUSCH transmission slots, by using at least one of the at least one slot format indicator and the DCI, may include determining a PUSCH transmission start symbol of a first PUSCH transmission slot from among the plurality of PUSCH transmission slots based on the DCI, and determining the resource domain allocated for transmission of the uplink data of remaining PUSCH transmission slots based on the at least one slot format indicator.

The determining of the resource domain allocated for transmission of the uplink data in the plurality of PUSCH transmission slots, by using at least one of the at least one slot format indicator and the DCI, may include determining a PUSCH transmission start symbol and a PUSCH transmission end symbol of each of the plurality of PUSCH transmission slots based on the DCI.

The determining of the resource domain allocated for transmission of the uplink data in the plurality of PUSCH transmission slots, by using at least one of the at least one slot format indicator and the DCI, may include determining a PUSCH transmission start symbol of a first PUSCH transmission slot and a PUSCH transmission end symbol of a last PUSCH transmission slot from among the plurality of PUSCH transmission slots based on the DCI, and determining all symbols between the PUSCH transmission start symbol and the PUSCH transmission end symbol as the resource domain allocated for transmission of the uplink data.

The determining of the resource domain allocated for transmission of the uplink data in the plurality of PUSCH transmission slots, by using at least one of the at least one slot format indicator and the DCI, may include determining whether the at least one slot format indicator is used based on a channel access procedure type of the terminal.

According to an embodiment of the present disclosure, a method, performed by a base station, of performing communication according to an allocated resource domain in a wireless communication system includes: transmitting configuration information for control channel and data channel transmission and reception; transmitting downlink control information (DCI) including physical uplink shared channel (PUSCH) transmission slot scheduling information and at least one slot format indicator corresponding to a plurality of PUSCH transmission slots, based on the configuration information; and receiving uplink data from a terminal by using a resource domain determined based on at least one of the at least one slot format indicator and the DCI.

According to an embodiment of the present disclosure, a terminal for performing communication according to an allocated resource domain in a wireless communication system includes: a transceiver; and at least one controller coupled to the transceiver, and configured to obtain configuration information for control channel and data channel transmission and reception, obtain downlink control information (DCI) including physical uplink shared channel (PUSCH) transmission slot scheduling information and at least one slot format indicator corresponding to a plurality of PUSCH transmission slots based on the configuration information, identify the plurality of PUSCH transmission slots based on the DCI, determine a resource domain allocated for transmission of uplink data in the plurality of PUSCH transmission slots by using at least one of the at least one slot format indicator and the DCI, and transmit the uplink data by using the determined resource domain.

The at least one controller may be further configured to determine an uplink symbol of the identified plurality of PUSCH transmission slots as the resource domain allocated for transmission of the uplink data, and determine a flexible symbol of the identified plurality of PUSCH transmission slots based on the at least one slot format indicator.

The at least one controller is further configured to determine a PUSCH transmission start symbol of a first PUSCH transmission slot and a PUSCH transmission end symbol of a last PUSCH transmission slot from among the plurality of PUSCH transmission slots based on the DCI, and determine the resource domain allocated for transmission of the uplink data of remaining PUSCH transmission slots based on the at least one slot format indicator.

According to an embodiment of the present disclosure, a base station for performing communication according to an allocated resource domain in a wireless communication system includes: a transceiver; and at least one controller coupled to the transceiver, and configured to transmit configuration information for control channel and data channel transmission and reception, transmit downlink control information (DCI) including physical uplink shared channel (PUSCH) transmission slot scheduling information and at least one slot format indicator corresponding to a plurality of PUSCH transmission slots based on the configuration information, and receive uplink data from a terminal by using a resource domain determined based on at least one of the at least one slot format indicator and the DCI.

Mode of Disclosure

Hereinafter, embodiments of the present disclosure will be described in detail with reference to the attached drawings. While describing the present disclosure, detailed descriptions of related well known functions or configurations that may blur the points of the present disclosure are omitted. The terms used herein are those defined in consideration of functions in the present disclosure, but the terms may vary according to the intention of users or operators, precedents, etc. Therefore, the terms used herein have to be defined based on the meaning of the terms together with the description throughout the specification.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

Hereinafter, embodiments of the present disclosure will be described in detail with reference to the attached drawings. While describing embodiments of the present disclosure, descriptions of techniques that are well known in the art and not directly related to the present disclosure are omitted. This is to clearly convey the points of the present disclosure by omitting an unnecessary explanation.

For the same reason, some elements in the attached drawings are exaggerated, omitted, or schematically illustrated. Also, a size of each element does not entirely reflect a real size of the element. In the drawings, the same or corresponding elements are denoted by the same reference numerals.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer-executable or computer-readable memory that may direct a computer or other programmable data processing apparatus to function in a particular manner, the instructions stored in the computer-executable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

The term "~ unit" used in the present embodiment refers to a software or hardware component, such as a field-programmable gate array (FPGA) or an application-specific integrated circuit (ASIC), which performs certain tasks. However, "~ unit" does not mean to be limited to software or hardware. The term "~ unit" may be configured to be in an addressable storage medium or configured to operate one or more processors. Thus, "~ unit" may include, by way of example, components, such as software components, objectoriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Further, components and "~ units" may be implemented to operate one or more central processing units (CPUs) in a device or a secure multimedia card. Also, a unit in an embodiment may include one or more processors.

A $5^{th}$ generation (5G) system considers supporting various services, compared to an existing $4^{th}$ generation (4G) system. Examples of representative services of a 5G system may include enhanced mobile broadband (eMBB), ultra-reliable and low latency communications (URLLC), massive machine type communications (mMTC), and evolved multimedia broadcast/multicast service (eMBMS). However, the present disclosure is not limited thereto. A system providing the URLLC service may be referred to as a URLLC system, and a system providing the eMBB service may be referred to as an eMBB system. Also, the terms "service" and "system" may be interchangeably used.

As described above, a plurality of services may be provided to a user in a communication system. In order to provide a plurality of services to a user, a method capable of providing a user with each service according to characteristics within the same time interval and an apparatus using the method are required.

In a wireless communication system, for example, a long term evolution (LTE) or LTE-advanced (LTE-A) system or a 5G new radio (NR) system, a base station may transmit downlink control information (DCI) including resource allocation information, through which a downlink signal transmitted from the base station to a terminal is transmitted, to the terminal through a downlink control channel (physical downlink control channel (PDCCH)) and the terminal may receive at least one downlink signal from among downlink control information (e.g., a channel-state information reference signal (CSI-RS)), a broadcast channel (physical broadcast channel (PBCH), and a downlink data channel (physical downlink shared channel (PDSCH)).

For example, the base station transmits downlink control information (DCI) indicating reception of a PDSCH in a subframe n through a PDCCH to the terminal, and the terminal receiving the downlink control information (DCI) receives the PDSCH in the subframe n according to the received downlink control information.

In the LTE, LTE-A, or NR system, the base station may transmit downlink control information (DCI) including uplink resource allocation information to the terminal through the downlink control channel (PDCCH) and the terminal may transmit at least one uplink signal from among uplink control information (e.g., a sounding reference signal (SRS), uplink control information (UCI), or physical random access channel (PRACH)) and uplink data channel (physical uplink shared channel (PUSCH)) to the base station.

For example, the terminal receiving uplink transmission configuration information (or uplink DCI or UL grant) transmitted through the PDCCH from the base station in the subframe n may perform uplink data channel transmission (hereinafter, referred to as PUSCH transmission) according to a time defined in advance (e.g., n+4), a time configured through a higher layer signal (e.g., n+k), or uplink signal transmission time indicator information (e.g., n+k) included in the uplink transmission configuration information.

When the configured downlink transmission is performed from the base station to the terminal through an unlicensed band or the configured uplink transmission is performed from the terminal to the base station through an unlicensed band, a transmission device (the base station or the terminal) may perform a channel access procedure (or listen-before talk (LBT)) for the unlicensed band in which the signal transmission is configured before or immediately before a time at which the configured signal transmission starts, and when it is determined that the unlicensed band is in an idle state based on the result of the channel access procedure, may access the unlicensed band and perform the configured signal transmission.

When it is determined that the unlicensed band is not in the idle state or is in an occupied state according to the channel access procedure performed by the transmission device, the transmission device may not access the unlicensed band and thus may not perform the configured signal transmission. In the channel access procedure in the unlicensed band in which the signal transmission is configured, the transmission device receives a signal in the unlicensed band during a certain time or a time calculated according to a predefined rule (e.g., a time calculated through one random value selected by at least the base station or the terminal) and compares an intensity of the received signal with a predefined threshold value or a threshold value calculated by a function including at least one parameter from among a channel bandwidth, a signal bandwidth in which the signal to be transmitted is transmitted, an intensity of transmission power, and a beam width of the transmitted signal, so as to determine whether the unlicensed band is in the idle state.

For example, when the intensity of the signal received by the transmission device during 25 us is smaller than a predefined threshold value of −72 dBm, it may be determined that the unlicensed band is in the idle state and the configured signal transmission may be performed. In this case, a maximum time during which the signal is transmitted may be limited according to a maximum channel occupancy time (MCOT) defined for each country or each region in the unlicensed band or a type of the transmission device (e.g., the base station, the terminal, a master device, or a slave device). For example, in Japan, after performing a channel access procedure in an unlicensed band of 5 GHz, the base station or the terminal may occupy a channel during a maximum of 4 ms without an additional channel access procedure and may transmit a signal. When the intensity of the signal received during 25 us is greater than a predefined threshold value of −72 dBm, the base station determines that the unlicensed band is not in an idle state and does not transmit a signal.

In the 5G communication system, in order to provide various services and support a high data rate, various technologies for performing retransmission in units of code block groups and transmitting an uplink signal without uplink scheduling information will be introduced. Accordingly, when 5G communication is performed through the unlicensed band, a more efficient channel access procedure considering various parameters is needed.

A wireless communication system has developed beyond the initially provided voice-based service into a broadband wireless communication system that provides a high speed and high quality packet data service, like communication standards such as high-speed packet access (HSPA) of $3^{rd}$ generation partnership project (3GPP), long term evolution (LTE) or evolved universal terrestrial radio access (E-UTRA), LTE-advanced (LTE-A), high-rate packet data (HRPD) of 3GPP2, ultra-mobile broadband (UMB), and 802.16e of Institute of Electrical and Electronics Engineers (IEEE). Also, communication standards of 5G or New Radio (NR) are being developed as a 5G wireless communication system.

In the wireless communication system including 5G, at least one service from among enhanced mobile broadband (eMBB), massive machine type communications (mMTC), and ultra-reliable and low-latency communications (URLLC) may be provided to the terminal. The services may be provided to the same terminal within the same time interval. In an embodiment, the eMBB may be a service aimed at high-speed transmission of large amounts of data, the mMTC may be a service aimed at minimizing terminal power and accessing multiple terminals, and the URLLC may be a service aimed at high reliability and low latency, but the present disclosure is not limited thereto. The three services may be main scenarios in the LTE system or the 5G/NR system after LTE.

When the base station schedules data corresponding to the eMBB service in any terminal in a specific transmission time interval (TTI) and URLLC data should be transmitted in the TTI, the base station does not transmit some of the eMBB data in the frequency band in which the eMBB data has already been scheduled and is being transmitted and transmits the generated URLLC data in the frequency band. The terminal in which eMBB is scheduled and the terminal in which URLLC is scheduled may be the same terminal or different terminals. In this case, some of the eMBB data which has already been scheduled and is being transmitted are not transmitted, and thus the risk of damage to the eMBB data increases. Accordingly, in this case, it is required to determine a method of processing a signal received by the terminal in which the eMBB data is scheduled or the terminal in which the URLLC data is scheduled and a method of receiving the signal.

Hereinafter, embodiments of the present disclosure will be described in detail with reference to the attached drawings. While describing the present disclosure, detailed descriptions of related functions or configurations that may blur the points of the present disclosure are omitted. The terms used herein are those defined in consideration of functions in the present disclosure, but the terms may vary according to the intention of users or operators, precedents, etc. Therefore, the terms used herein have to be defined based on the meaning of the terms together with the description throughout the specification. Hereinafter, the base station is an entity that allocates resources to the terminal and may include at least one of an eNode B, a Node B, a base station (BS), a radio access unit, a base station controller, and a node on a network. The terminal may include a user equipment (UE), a mobile station (MS), a cellular phone, a smartphone, a computer, or a multimedia system capable of performing a communication function. In the present disclosure, a downlink (DL) refers to a wireless transmission path of a signal that the base station transmits to the terminal, and an uplink (UL) refers to a wireless transmission path of a signal that the terminal transmits to the base station. Hereinafter, the LTE or LTE-A system is described in an embodiment of the present disclosure, but the embodiment of the present disclosure may be applied to other communication systems having a similar technical background or channel form. For example, other communication systems may include 5G mobile communication technology (5G, new radio, or NR) developed after LTE-A. The embodiments of the present disclosure may be applied to other communication systems through some modifications without departing from the scope of the present disclosure based on determination by one of ordinary skill in the art.

The NR system, which is a representative example of the broadband wireless communication system, employs an orthogonal frequency division multiplexing (OFDM) scheme for a downlink (DL), and employs both the OFDM scheme and a single carrier frequency division multiple access (SC-FDMA) scheme for an uplink (UL). The uplink is a radio link through which the terminal (or user equipment (UE)) or a mobile station (MS) transmits data or a control signal to the base station (or an eNode B), and the downlink is a radio link through which the base station transmits data or a control signal to the terminal. In the multi-access scheme described above, time-frequency resources for carrying data or control information are allocated and operated in a manner to prevent overlapping of the resources, i.e., to establish orthogonality between users so as to identify data or control information of each user.

The NR system employs a hybrid automatic repeat request (HARQ) scheme that retransmits the corresponding data on a physical layer when decoding fails at the initial transmission. In the HARQ scheme, when a receiver does not accurately decode data, the receiver transmits information (negative acknowledgement (NACK)) indicating a failure in decoding to a transmitter, so that the transmitter retransmits the corresponding data on the physical layer. The receiver increases data reception performance by combining the data retransmitted by the transmitter with the data of which decoding failed. Also, when the receiver accurately decodes data, the receiver transmits information (acknowledgement (ACK)) indicating a success in decoding to the transmitter, so that the transmitter transmits new data.

Hereinafter, a method by which a wireless communication system, particularly, a node that receives a downlink signal in an unlicensed band or a system and a node that are to transmit an uplink signal determine a downlink reception resource domain or an uplink transmission resource domain through scheduling information and received slot structure information will be described.

FIG. 1 is a diagram illustrating a basic structure of a time-frequency domain that is a radio resource domain where data or a control channel is transmitted in an uplink/downlink of an NR system or the like, according to some embodiments of the present disclosure.

Referring to FIG. 1, the horizontal axis represents a time domain and the vertical axis represents a frequency domain in the radio resource domain. A minimum transmission unit in the time domain may be an orthogonal frequency-division multiplexing (OFDM) symbol or a discrete Fourier transform (DFT)-spread-OFDM (DFT-s-OFDM) symbol, and $N_{symb}$ OFDM or DFT-s-OFDM symbols 101 may be combined to constitute one slot 102. In some embodiments, the OFDM symbol may include a symbol for the case of transmitting/receiving a signal by using an OFDM multiplexing scheme, and the DFT-s-OFDM symbol may include a symbol for the case of transmitting/receiving a signal by using a DFT-s-OFDM or single-carrier frequency-division multiple access (SC-FDMA) multiplexing scheme. Hereinafter, the present disclosure will be described based on the OFDM symbol without distinction between the OFDM symbol and the DFT-s-OFDM symbol for convenience of explanation, and the description will be made based on downlink signal transmission/reception but may also be applied to uplink signal transmission/reception.

When the subcarrier spacing is 15 kHz, one slot 102 constitutes one subframe 103, and a length of each of the slot 102 and the subframe 103 may be 1 ms. In some embodiments, the number of slots 102 and lengths of the slots 102 constituting one subframe 103 may vary according to subcarrier spacing. For example, when the subcarrier spacing is 30 kHz, four slots 102 may constitute one subframe 103. In this case, a length of the slot 102 is 0.5 ms and a length of the subframe 103 is 1 ms. A radio frame 104 may be a time domain section including 10 subframes. A minimum transmission unit in a frequency domain is a subcarrier, and an entire system transmission band (transmission bandwidth) includes a total of $N_{sc}^{BW}$ subcarriers 105.

However, detailed values such as subcarrier spacing, the number of slots 102 included in the subframe 103, a length of the slot 102, and a length of the subframe 103 may be variable. For example, in an LTE system, subcarrier spacing is 15 kHz, but two slots constitute one subframe 103, wherein a length of the slot 102 is 0.5 ms and a length of the subframe 103 is 1 ms.

A basic resource unit in a time-frequency domain may be a resource element (RE) 106, and the resource element 106 may be represented by an OFDM symbol index and a subcarrier index. A resource block (RB or physical resource block (PRB)) 107 may be defined by $N_{symb}$ consecutive OFDM symbols 101 in the time domain and $N_{SC}^{RB}$ consecutive subcarriers 108 in the frequency domain. Accordingly, one RB 107 in one slot may include $N_{symb} \times N_{SC}^{RB}$ REs. In general, a minimum allocation unit of data in the frequency domain is the RB 107. In the NR system, generally, $N_{symb}=14$, $N_{SC}^{RB}=12$, and the number $N_{RB}$ of RBs may vary according to a bandwidth of a system transmission band. In the LTE system, generally, $N_{symb}=7$, $N_{SC}^{RB}=12$, and $N_{RB}$ may vary according to a bandwidth of a system transmission band.

Downlink control information may be transmitted within first N OFDM symbols in the subframe. In general, N={1, 2, 3}, and a terminal may be configured with the number of symbols on which downlink control information may be transmitted, from a base station through a higher layer signal. The base station may change the number of symbols on which the downlink control information may be transmitted in each slot according to the amount of control information to be transmitted in a current slot, and may transfer information on the number of symbols to the terminal via a separate downlink control channel.

In the NR or LTE system, scheduling information of downlink data or uplink data may be transmitted from the base station to the terminal through downlink control information (DCI). In some embodiments, the DCI may be defined according to various formats, and each format may indicate whether the DCI includes scheduling for uplink data information (e.g., UL grant) or includes scheduling information for downlink data (e.g., DL grant), whether the DCI is compact DCI having a small size of control information, whether the DCI is fallback DCI, whether spatial multiplexing using multiple antennas is applied, and/or whether the DCI is for power control. For example, a DCI format (e.g., DCI format 1_0 of NR), which is scheduling control information for downlink data (DL grant), may include at least one of the following control information.

Control information format identifier (DCI format identifier): Identifier for identifying a format of received DCI Frequency domain resource assignment: Indicating an RB allocated for data transmission Time domain resource assignment: Indicating a slot and a symbol allocated for data transmission VRB-to-PRB mapping: Indicating whether to apply a virtual resource block (VRB) mapping scheme Modulation and coding scheme (MCS): Indicating a modulation scheme used for data transmission and a size of a transport block that is data to be transmitted New data indicator: Indicating whether transmission is HARQ initial transmission or HARQ retransmission Redundancy version: Indicating a redundancy version of HARQ HARQ process number: Indicating a process number of HARQ PDSCH allocation information (downlink assignment index): Indicating, to the terminal, the number of PDSCH reception results (e.g., the number of HARQ-ACKs) to be reported to the base station Transmission power control (TPC) command for physical uplink control channel (PUCCH): Indicating a transmission power control command for a PUCCH that is an uplink control channel PUCCH resource indicator: Indicating a PUCCH resource used for an HARQ-ACK report, including a reception result of a PDSCH configured through corresponding DCI PUCCH transmission timing indicator (PDSCH-to-HARQ_feedback timing indicator): Indicating information of a slot or a symbol, on which a PUCCH for an HARQ-ACK report including a reception result of a PDSCH configured through corresponding DCI should be transmitted The DCI may be transmitted through a physical downlink control channel (PDCCH) (or control information, hereinafter the PDCCH is interchangeably used with the control information) or an enhanced PDCCH (EPDCCH) (or enhanced control information, hereinafter the EPDCCH is interchangeably used with the enhanced control information), through a channel coding and modulation process.

In general, the DCI may be scrambled by a particular radio network temporary identifier (RNTI) or a terminal identifier C-RNTI, independently for each terminal, a cyclic redundancy check (CRC) may be added thereto, and channel coding may be performed, and then each independent PDCCH may be configured and transmitted. In the time domain, the PDCCH is mapped and transmitted during a control channel transmission interval. A mapping location of the PDCCH in the frequency domain may be determined by an identifier (ID) of each terminal, and may be distributed and transmitted over the entire system transmission band.

Downlink data may be transmitted through a physical downlink shared channel (PDSCH) that is a physical channel for downlink data transmission. The PDSCH may be transmitted after the control channel transmission interval, and a detailed mapping location in the frequency domain and scheduling information such as a modulation scheme are determined based on the DCI transmitted through the PDCCH.

Via a modulation coding scheme (MCS) in control information constituting the DCI, the base station notifies a modulation scheme applied to the PDSCH to be transmitted to the terminal and a transport block size (TBS) of data to be transmitted. In some embodiments, the MCS may be configured of 5 bits or bits larger or less than 5 bits. The TBS corresponds to a size before channel coding for error correction is applied to data (transport block (TB)) to be transmitted by the base station.

Modulation schemes supported by the NR system include quadrature phase shift keying (QPSK), 16 quadrature amplitude modulation (QAM), 64 QAM, and 256 QAM, and modulation orders (Qm) thereof are respectively 2, 4, and 6. That is, 2 bits per symbol for QPSK modulation, 4 bits per symbol for 16 QAM modulation, 6 bits per symbol for 64 QAM modulation, and 8 bits per symbol for 256 QAM modulation may be transmitted. Also, modulation schemes higher than 256 QAM may be used according to system deformation.

In the NR system, an uplink/downlink HARQ adopts an asynchronous HARQ scheme in which a data retransmission time is not fixed. For example, in the case of downlink, when the base station receives, from the terminal, HARQ NACK as feedback on initially transmitted data, which is transmitted by the base station, the base station may arbitrarily determine a point of transmission time for data to be retransmitted, according to a scheduling operation. The terminal may buffer data determined as an error, as a result of decoding the received data for an HARQ operation, and may then combine the buffered data with the data retransmitted from the base station. HARQ ACK/NACK information of the PDSCH transmitted in a subframe n-k may be transmitted from the terminal to the base station through the PUCCH or the PUSCH in the subframe n.

In some embodiments, in the 5G communication system such as NR, the value of k may be transmitted while being included in DCI indicating or scheduling reception of the PDSCH transmitted in the subframe n-k, or may be configured in the terminal through a higher layer signal. In this case, the base station may configure one or more k values through a higher layer signal, or may indicate a specific k value through DCI. Here, k may be determined according to HARQ-ACK processing capability of the terminal, in other words, a minimum time required to receive the PDSCH, and generate and report the HARQ-ACK for the PDSCH. Also, the terminal may use a default value or a predefined value before the value of k is configured.

Although an NR system has been described to describe a wireless communication system and a method and apparatus provided by embodiments of the present disclosure, the present disclosure is not limited to the NR system and may be applied to various wireless communication systems such as LTE, LTE-A, LTE-A-Pro, and 5G. Also, although a system and device that transmit/receive a signal by using an unlicensed band have been described, the present disclosure may also be applied to a system operating in a licensed band.

Hereinafter, in the present disclosure, higher layer signaling or a higher layer signal may be a method of transmitting a signal from the base station to the terminal by using a downlink data channel of a physical layer, or transmitting a signal from the terminal to the base station by using an uplink data channel of a physical layer, and may include a method of transmitting a signal through radio resource control (RRC) signaling, packet data convergence protocol (PDCP) signaling, or a media access control (MAC) control element (CE). The higher layer signaling or the higher layer signal may include system information, for example, a system information block (SIB), which is commonly transmitted to a plurality of terminals.

In a system that performs communication in an unlicensed band, a transmission device (the base station or the terminal) that is to transmit a signal via the unlicensed band may perform a channel access procedure (or listen-before-talk (LBT)) for the unlicensed band in which the communication is to be performed before transmitting the signal, and when it is determined that the unlicensed band is in an idle state according to the channel access procedure, may access the unlicensed band and may transmit the signal. When it is determined, according to the channel access procedure, that the unlicensed band is not in the idle state, the transmission device may not transmit the signal.

In the channel access procedure in the unlicensed band, generally the transmission device measures an intensity of a signal received through the unlicensed band for a fixed time or a time calculated according to a predefined rule (e.g., a time calculated based on a random value selected by at least the base station or the terminal), and compares the measured intensity of the received signal with a predefined threshold value or a threshold value calculated by a function for determining the intensity of the received signal according to at least one parameter from among a channel bandwidth, a signal bandwidth in which the signal to be transmitted is transmitted, and an intensity of transmission power, so as to determine the idle state of the unlicensed band.

For example, the transmission device may measure the intensity of the received signal during X μs (e.g., 25 μs) immediately before the signal is to be transmitted, and when the measured intensity of the signal is smaller than a predefined or calculated threshold value T (e.g., −72 dBm), the transmission device may determine that the unlicensed band is in the idle state and may transmit the configured signal. A maximum time during which the signal may be successively transmitted after the channel access procedure may be limited according to a maximum channel occupancy time (MCOT) defined for each country, each region, or each frequency band, or a type of the transmission device (e.g., the base station, the terminal, a master device, or a slave device). For example, in Japan, after performing the channel access procedure in an unlicensed band of 5 GHz, the base station or the terminal may occupy a channel during a maximum of 4 ms in an unlicensed band determined to be in the idle state without additional channel access procedure and transmit a signal.

More specifically, when the base station or the terminal attempts to transmit a downlink or uplink signal in the unlicensed band, the channel access procedure that may be performed by the base station or the terminal may be classified into at least the following types.

Type 1: Performing uplink/downlink signal transmission after performing a channel access procedure during a variable time Type 2: Performing uplink/downlink signal transmission after performing a channel access procedure during a fixed time Type 3: Performing uplink or downlink signal transmission without performing a channel access procedure Hereinafter, although the present disclosure interchangeably describes a case where the base station transmits a downlink signal to the terminal through an unlicensed band and a case where the terminal transmits an uplink signal to the base station through an unlicensed band, the description of the present disclosure may be equally applied to a case where the terminal transmits an uplink signal to the base station through an unlicensed band and a case where the base station transmits a downlink signal to the terminal through an unlicensed band or some modifications thereof may be applied. Accordingly, detailed descriptions of downlink signal transmission/reception are omitted. Also, the present disclosure assumes that one piece of data information (codeword or TB) or uplink data information is transmitted/received between the base station and the terminal. However, the description of the present disclosure may also be applied to a case where the base station transmits downlink signals to a plurality of terminals or a case where a plurality of codewords or TBs are transmitted/received between the base station and the terminal.

A transmission node (hereinafter, referred to as the base station or the terminal) which attempts to transmit a signal through an unlicensed band may determine a channel access procedure scheme according to a type of the signal to be transmitted. For example, when the base station attempts to transmit a downlink signal including a downlink data channel in the unlicensed band, the base station may perform a channel access procedure of Type 1. When the base station attempts to transmit a downlink signal, which does not include a downlink data channel, for example, a synchronization signal or a downlink control channel, in the unlicensed band, the base station may perform a channel access procedure of Type 2 and transmit the downlink signal.

The channel access procedure scheme may be determined according to a length of transmission of the signal to be transmitted in the unlicensed band or a length of a time or an interval occupying and using the unlicensed band. In general, it takes a longer time to perform the channel access procedure of Type 1 than the channel access procedure of Type 2. Accordingly, when a signal is transmitted during a short time interval or a time equal to or shorter than a reference time (e.g., X ms or Y symbols), the channel access procedure of Type 2 may be performed. On the other hand, when a signal is transmitted during a long time interval or a time longer than or equal to a reference time (e.g., X ms or Y symbols), the channel access procedure of Type 1 may be performed. In other words, channel access procedures of different types may be performed according to an unlicensed band use time.

When the channel access procedure of Type 1 is performed according to at least one of the criteria, the transmission node may determine a channel access priority class according to a quality of service class identifier (QCI) of a signal to be transmitted in the unlicensed band, and may perform the channel access procedure by using at least one of predefined configuration values shown in Table 1 for the determined channel access priority class.

For example, QCIs 1, 2, and 4 are QCI values for services such as conversational voice, conversational video (live streaming), and non-conversational video (buffered streaming), respectively. When a signal for a service that does not match a QCI in Table 1 is transmitted in the unlicensed band, the transmission node may select a QCI, which is closest to the service and the QCI in Table 1 and may select a channel access priority class therefor.

Table 1 shows a mapping relationship between channel access priority classes and quality of service class identifiers (QCIs).

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

For example, a defer duration, a set (CW_p) of contention window values or sizes, a minimum value and a maximum value (CW_min,p and CW_max,p) of a contention window, and a maximum channel occupation interval (T_mcot,p) according to a determined channel access priority class p may be determined through Table 2.

In other words, the base station that attempts to transmit a downlink signal through the unlicensed band, performs a channel access procedure for the unlicensed band during at least T_f+m_p*T_sl. When the channel access procedure is performed with channel access priority class 3 (p=3), the size T_f+m_p*T_sl of the defer duration required to perform the channel access procedure may be configured by using m_p=3. T_f is a fixed value of 16 us, of which a first T_sl time during T_f should be in an idle state, and the base station may not perform the channel access procedure at the remaining time T_f−T_sl after the T_sl time during the T_f time. In this case, even when the base station performs the channel access procedure at the remaining time T_f−T_sl, a result of the channel access procedure is not used. In other words, the T_f−T_sl time is a time for delaying, by the base station, execution of the channel access procedure.

When it is determined that the unlicensed band is in the idle state during the m_p*T_sl time, N=N−1. In this case, N is selected as a random integer value between 0 and a value of the contention window (CW_p) at the time when the channel access procedure is performed. In the case of channel access priority class 3, a minimum contention window and a maximum contention window are 15 and 63, respectively. When it is determined that the unlicensed band is in the idle state in the defer duration and an additional channel access procedure interval, the base station may transmit a signal through the unlicensed band for a time of T_mcot,p (8 ms). Table 2 shows channel access priority classes in downlink. Although the present disclosure is described by using downlink channel access priority classes for convenience of explanation, the channel access priority classes in Table 2 may be reused or channel access priority classes for uplink transmission may be defined and used in uplink.

TABLE 2

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window (CW_p) is the minimum value (CW_min,p) of the contention window. The base station selecting N performs the channel access procedure in the T_sl interval, and when it is determined that the unlicensed band is in the idle state through the channel access procedure performed in the T_sl time, the base station may change N to N−1 (N=N−1) and when N=0, the base station may transmit a signal during for up to T_mcot,p through the unlicensed band. When the unlicensed band determined through the channel access procedure at the T_sl time is not in the idle state, the base station may perform the channel access procedure again without changing the value of N.

A value of the contention window (CW_p) may be changed based on a reception result of a downlink data channel in a reference subframe or a reference slot during a downlink signal transmission interval (or a maximum channel occupancy time (MCOT)) in which the base station most recently transmits a signal through the unlicensed band at a time point at which the base station starts the channel access procedure or a time point at which or right before the base station selects N in order to perform the channel access procedure. In other words, the base station may receive a report on the reception result of the downlink data transmitted in the reference subframe or the reference slot from the terminal and increase or minimize a size of CW_p according to a ratio (Z) of NACK in the received report on the reception result.

Figure 2:
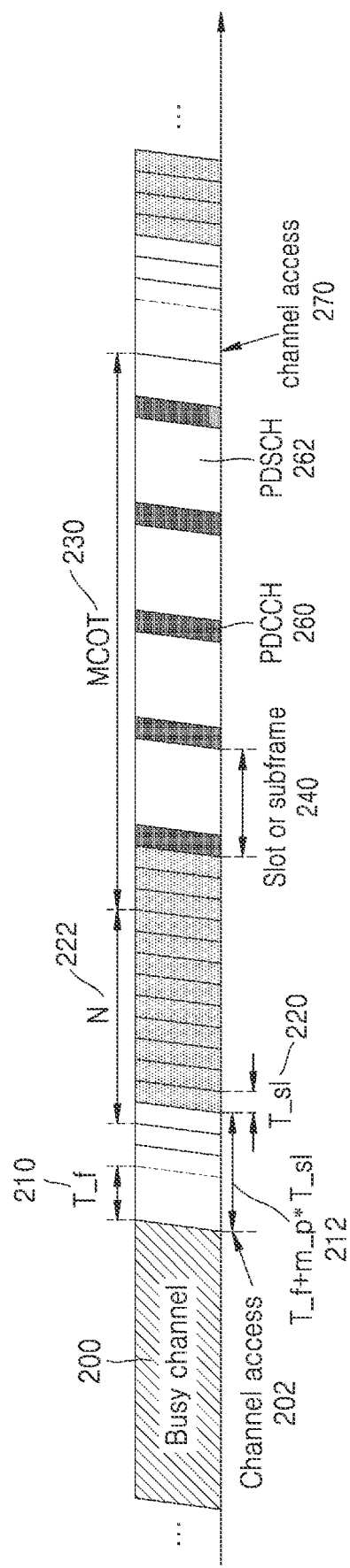
FIG. 2 is a diagram illustrating a channel access procedure in an unlicensed band, according to some embodiments of the present disclosure.

Referring to FIG. 2, a first transmission interval 240 (hereinafter, referred to as a slot or a subframe) of a downlink signal transmission interval 230 in which a base station most recently transmits a signal through an unlicensed band at a time point 270 at which the base station starts the channel access procedure or a time point at which or right before the base station selects N in order to perform the channel access procedure is a reference slot for changing a contention window for the channel access procedure.

When the base station may not receive a report on a reception result of a downlink data channel transmitted in the first slot 240 of the transmission interval 230, for example, when a time interval between a first subframe and the time point 270 at which the base station starts the channel access procedure is equal to or less than n slots or subframes, (i.e., when the base station starts the channel access procedure before a time at which a terminal may report a downlink data channel reception result for the first subframe 240), a first subframe of a most recent downlink signal transmission interval before the downlink signal transmission interval 230 is a reference subframe. In other words, when the base station may not receive a reception result of downlink data transmitted in the reference subframe 240 from the terminal at the time point 270 at which the base station starts the channel access procedure or the time point at which or right before the base station selects N in order to perform the channel access procedure, the base station may determine, as the reference subframe, a first subframe of a most recent downlink signal transmission interval from among reception results of the downlink data channel previously received from terminals. The base station may determine a size of the contention window used for the channel access procedure 270 by using the reception results of the downlink data received from the terminals with respect to the downlink data transmitted through the downlink data channel in the reference subframe.

For example, the base station transmitting a downlink signal through a channel access procedure (e.g., CW_p=15) configured through channel access priority class 3 (p=3) may increase the contention window from an initial value (CW_p=15) to a next contention window value (CW_p=31) when it is determined that NACK is equal to or greater than 80% in the reception results of the terminal with respect to the downlink data transmitted to the terminal through the downlink data channel in the first subframe from among downlink signals transmitted through the unlicensed band.

When it is not determined that NACK is equal to or greater than 80% in the reception results of the terminal, the base station may maintain a value of the contention window as an existing value or may change the value of the contention window to the initial value of the contention window. In this case, the change in the contention window may be commonly applied to all channel access priority classes or may be applied only to the channel access priority class used for the channel access procedure. In this case, a method of determining a reception result valid for determining a change in a size of the contention window, in other words, a method of determining a Z value, from among the reception results of the downlink data which the terminal transmits or reports to the base station with respect to the downlink data transmitted through the downlink data channel in the reference subframe or the reference slot for determining the change in the size of the contention window is described below.

When the base station transmits one or more codewords or TBs to one or more terminals in the reference subframe or the reference slot, the base station may determine the Z value based on a ratio of NACK in the reception results transmitted or reported by the terminal for the TBs received in the reference subframe or the reference slot. For example, when two codewords or two TBs are transmitted to one terminal in the reference subframe or the reference slot, the base station receives or is reported downlink data signal reception results for two TBs from the terminal. When the ratio Z of NACK in the two reception results is equal to or greater than a threshold value (e.g., Z=80%) predefined or configured between the base station and the terminal, the base station may change or increase the size of the contention window.

In this case, when the terminal bundles the downlink data reception results for one or more subframes (e.g., M subframes) including the reference subframe or slot and transmits or report the same to the base station, the base station may determine that the terminal transmits M reception results. The base station may determine the Z value based on the ratio of NACK in the M reception results, and change, maintain, or initialize the size of the contention window.

When the reference subframe is the reception result for a second slot among two slots included in one subframe, the terminal may determine the Z value based on the ratio of NACK in the reception results transmitted or reported to the base station by the terminal for the downlink data received in the reference subframe (in other words, the second slot) and a next subframe.

Also, in a case where scheduling information or downlink control information for the downlink data channel transmitted by the base station is transmitted in the same cell and frequency band as those in which the downlink data channel is transmitted or in a case where the scheduling information or downlink control information for the downlink data channel transmitted by the base station is transmitted in an unlicensed band but is transmitted in a cell or frequency band which is different from a cell in which the downlink data channel is transmitted, when the terminal is determined to transmit no reception result for the downlink data received in the reference subframe or the reference slot and the reception result for the downlink data transmitted by the terminal is determined to be at least one of discontinuous transmission (DTX), NACK/DTX, and any state, the base station may determine the reception result of the terminal as NACK and determine the Z value.

Also, in a case where the scheduling information or downlink control information for the downlink data channel transmitted by the base station is transmitted through the licensed band, when the reception result of the downlink data transmitted by the terminal is determined to be at least one of DTX, NACK/DTX, and any state, the base station may not allow the reception result of the terminal to be included in the reference value Z of contention window variation. In other words, the base station may determine the Z value while ignoring the reception result of the terminal.

Also, in a case where the base station transmits the scheduling information or downlink control information for the downlink data channel through a licensed band, when the base station actually transmits no downlink data (no transmission) in the reception result of the downlink data for the reference subframe or the reference slot transmitted or reported to the base station by the terminal, the base station may determine the Z value while ignoring the reception result transmitted or reported by the terminal for the downlink data.

The 5G system is required to flexibly define and operate the frame structure in consideration of various services and requirements. For example, respective services may have different subcarrier spacings according to requirements. A plurality of subcarrier spacings supported by a current 5G communication system may be determined by using Equation 1 below.

$$\Delta f = f_0 2^m \qquad \text{Equation 1}$$

In Equation 1, $f_0$ denotes basic subcarrier spacing of a system, and m denotes an integer scaling factor. For example, when $f_0$ is 15 kHz, a set of subcarrier spacings which the 5G communication system may have may include 3.75 kHz, 7.5 kHz, 15 kHz, 30 kHz, 60 kHz, 120 kHz, 240 kHz, and 480 kHz. A set of available subcarrier spacings may vary according to a frequency band. For example, 3.75 kHz, 7.5 kHz, 15 kHz, 30 kHz, and 60 kHz may be used in a frequency band equal to or lower than 6 GHz, and 60 kHz, 120 kHz, and 240 kHz may be used in a frequency band higher than or equal to 6 GHz.

In some embodiments, a length of a corresponding OFDM symbol may vary depending on subcarrier spacing of the OFDM symbol. This is because the subcarrier spacing and the length of the OFDM symbol have a reciprocal relationship therebetween according to characteristics of the OFDM symbol. For example, the symbol length is halved when the subcarrier spacing is doubled and the symbol length is doubled when the subcarrier spacing is halved.

Next, a resource domain in which a data channel is transmitted in the 5G communication system will be described.

Figure 3:
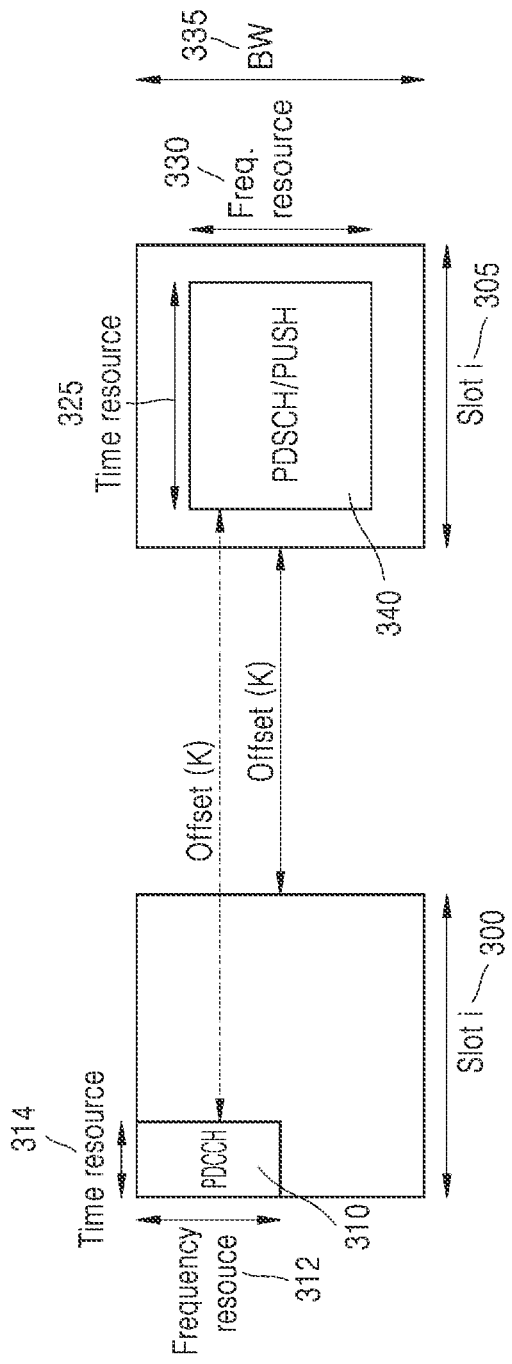
FIG. 3 is a diagram illustrating a downlink or uplink scheduling method and a resource domain in an NR system, according to some embodiments of the present disclosure.

FIG. 3 is a diagram illustrating a resource domain in which a data channel is transmitted in a 5G communication system, according to some embodiments of the present disclosure. A terminal monitors or searches for a PDCCH 310 in a downlink control channel (hereinafter, referred to as PDCCH) region (hereinafter, referred to as a control resource set (CORESET) or a search space (SS)) configured through a higher layer signal from a base station. The downlink CORESET may include information on a time domain 314 and a frequency domain 312, and the information on the time domain 314 may be configured in units of symbols and the information on the frequency domain 312 may be configured in units of RBs or groups of RBs.

When the terminal detects the PDCCH 310 in a slot i 300, the terminal obtains downlink control information (DCI) transmitted through the detected PDCCH 310. Through the received downlink control information (DCI), the terminal may obtain scheduling information of a downlink data channel or an uplink data channel. In other words, the DCI may include information on a resource domain (or a PDSCH transmission region) through which the terminal should receive the downlink data channel (hereinafter, referred to as PDSCH) transmitted from the base station or information on a resource domain which the terminal is allocated by the base station for transmission of uplink data channel (hereinafter, referred to as PUSCH) transmission.

A case where the terminal is scheduled for uplink data channel (PUSCH) transmission will be described below. The terminal receiving DCI may obtain a slot index of offset information K for receiving a PUSCH through the DCI and may determine a PUSCH transmission slot index. For example, the terminal may determine that the terminal is scheduled to transmit the PUSCH in a slot i+K 305 through the received offset information K, based on the slot i 300 in which the PDCCH 310 is received. The terminal may also determine the slot i+K 305 or a PUSCH start symbol or time in the slot i+K through the received offset information K, based on the control resource set (CORESET) in which the PDCCH 310 is received.

Also, the terminal may obtain information on a time-frequency resource domain 340 in the PUSCH transmission slot 305 based on the DCI. PUSCH transmission frequency resource domain information 330 may include PRB or PRB group unit information. Meanwhile, the PUSCH transmission frequency resource domain information 330 may be a region included in an initial uplink bandwidth (initial BW) or an initial uplink bandwidth part (initial BWP) determined or configured by the terminal through an initial access procedure. When the terminal receives an uplink bandwidth (BW) or an uplink bandwidth part (BPW) through a higher layer signal, the PUSCH transmission frequency resource domain information 330 may be a region included in the uplink bandwidth (BW) or the uplink bandwidth part (BWP) configured through a higher layer signal.

In some embodiments, PUSCH transmission time resource domain information 325 may be symbol or symbol group unit information, or may be information indicating absolute time information. The PUSCH transmission time resource domain information 325 may be expressed as a combination of a PUSCH transmission start time or symbol and a PUSCH length or a PUSCH end time or symbol, and may be included as one field or value in the DCI. In this case, the PUSCH transmission time resource domain information 325 may be included in the DCI as a field or value indicating each of the PUSCH transmission start time or symbol and the PUSCH length or the PUSCH end time or symbol. The terminal may transmit the PUSCH in the PUSCH transmission resource domain 340 determined through the DCI.

Figure 4:
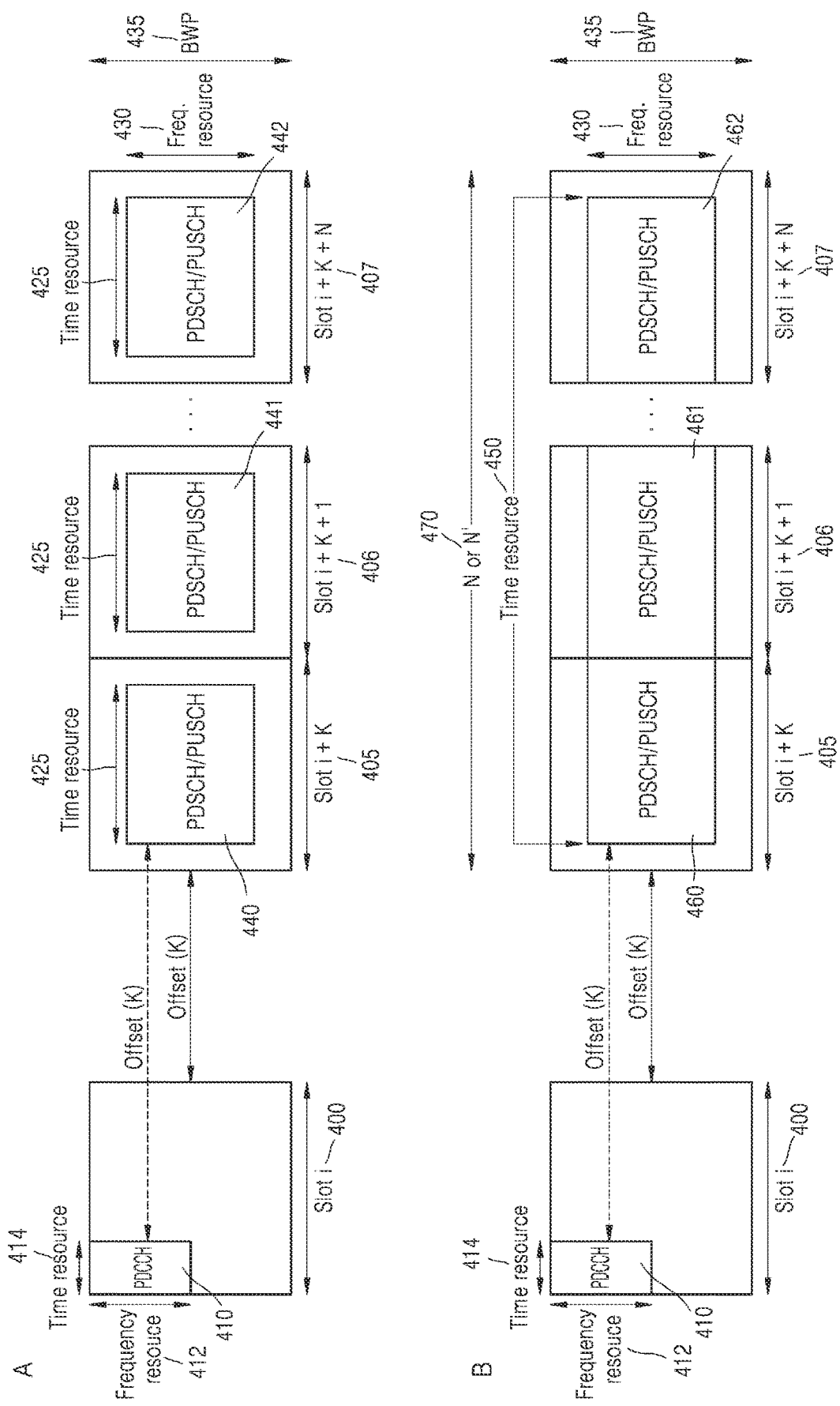
FIG. 4 is a diagram illustrating a downlink or uplink scheduling method and a resource domain in an NR system, according to some embodiments of the present disclosure.

FIG. 4 is a diagram illustrating a case where a downlink or uplink data channel is transmitted in N slots in a 5G communication system, according to some embodiments of the present disclosure.

A terminal may be configured to receive or transmit, in N (N≥1) slots, a PDSCH or a PUSCH scheduled through one PDCCH 410 through a higher layer signal from a base station. In this case, the terminal may receive a maximum value of the number N or N 470 of slots in which the PDSCH or the PUSCH scheduled through one PDCCH 410 through the higher layer signal is received or transmitted. In this case, when the terminal receives the maximum value of the N 470 through the higher layer signal, the number N' of PDSCH or PUSCH slots scheduled through DCI of the PDCCH 410 may be included. In this case, the number N' may be equal to or less than the number N. Also, in this case, in each of N or N' slots, the same data (or TB(s)) may be transmitted/received (hereinafter, a slot-aggregation mode), or different data (or TB(s)) may be transmitted/received (hereinafter, a multi-slot scheduling mode). The terminal configured to receive or transmit a PDSCH or a PUSCH scheduled through one PDCCH in a plurality of slots may be configured to use one of a slot-aggregation mode and a multi-slot scheduling mode through a higher layer signal.

The following will be described assuming that the terminal is configured to receive or transmit a PDSCH or a PUSCH scheduled through one PDCCH 410 in N or N' slots. The terminal searches for a resource domain of the PDCCH 410 configured through a higher layer signal from the base station. When the terminal detects the PDCCH 410 in a slot i 400, the terminal obtains downlink control information (DCI) transmitted through the detected PDCCH 410. Through the received downlink control information (DCI), the terminal may determine scheduling information for an uplink data channel, in other words, a resource domain allocated from the base station to the terminal for uplink data channel transmission. The number N' of slots in which the PDSCH or the PUSCH scheduled through one PDCCH is received or transmitted may be additionally included in the DCI. For convenience of explanation, in the present disclosure, N and N' are interchangeably used as N 470 without distinction therebetween.

The terminal may include, in the DCI, slot index information for receiving at least the PUSCH, for example, offset information K for indicating a slot i+K in which the PUSCH is transmitted based on a slot index i for receiving the PDCCH, and information on a PUSCH transmission time-frequency resource domain in a PUSCH transmission slot 405. In this case, the terminal may determine, based on a CORESET in which the PDCCH is received, the slot i+K or a PUSCH start symbol or time in the slot i+K through the received offset information K. PUSCH transmission frequency resource domain information 430 may be PRB or PRB group unit information. In some embodiments, although the PUSCH transmission frequency resource domain information of each of N slots may be included in the DCI, one PUSCH transmission frequency resource domain information 430 may be included in the DCI and may be equally applied to the N slots in order to reduce DCI payload.

PUSCH transmission time resource domain information 425 or 450 may be symbol or symbol group unit information, or may be information indicating absolute time information. In some embodiments, the PUSCH transmission time resource domain information may be expressed as a combination of a PUSCH transmission start time or symbol and a PUSCH length or a PUSCH end time or symbol. The terminal determining a PUSCH transmission resource domain through the DCI may transmit the PUSCH in the determined PUSCH transmission resource domain. For the terminal configured to transmit the PUSCH through one PDCCH in N 470 slots, offset information K for the N 470 slots and information on a plurality of PUSCH transmission time-frequency resource domains may be included in the DCI. However, in the present disclosure, the following will be described assuming that in order to minimize a size of the DCI, even for the terminal configured to transmit the PUSCH scheduled through one PDCCH in N 470 slots, offset information K for one slot and information on one PUSCH transmission time-frequency resource domain are included in the DCI.

That is, the terminal receiving the DCI may determine a PUSCH transmission resource domain in N consecutive slots from the slot i+K 405 by applying the obtained slot offset information K and the information on the PUSCH transmission time-frequency resource domain as shown in a or b of FIG. 4. In some embodiments, the N consecutive slots may be N consecutive slots regardless of whether the N consecutive slots are capable of scheduled uplink PUSCH transmission, or may be N slots determined to be capable of scheduled uplink PUSCH transmission.

In some embodiments, whether slots are capable of scheduled uplink PUSCH transmission may be determined based on at least one of downlink-uplink structure information configured through a higher layer signal, slot format indicator information indicated through the DCI, and a downlink or uplink signal transmission configuration pre-configured in the terminal through a higher layer signal. a of FIG. 4 corresponds to a case where the PUSCH transmission time-frequency resource domain of the DCI is equally applied to N slots. b of FIG. 4 corresponds to a case where PUSCH transmission start time or symbol information from among the PUSCH transmission time-frequency resource domain information 450 of the DCI is applied to the first slot 405 of the N slots and PUSCH transmission end time or symbol information is applied to the last slot 470 of the N slots. In some embodiments, it may be determined that in remaining slots 406 other than the first slot and the last slot of the N slots, all symbols of the slots are PUSCH transmission time resources.

In a 5G communication system, in order to dynamically change a downlink signal transmission interval and an uplink signal transmission interval in a time-division duplexing (TDD) system, whether each of OFDM symbols constituting one slot is a downlink symbol, an uplink symbol, or a flexible symbol may be indicated by a slot format indicator (SFI). The symbol indicated as a flexible symbol may be neither a downlink symbol nor an uplink symbol, or may be a symbol which may be changed to a downlink symbol or an uplink symbol by terminal-specific control information or scheduling information. In this case, the flexible symbol may include a gap guard required in a process of switching from downlink to uplink.

The slot format indicator may be concurrently transmitted to a plurality of terminals through a terminal group (or cell) common control channel. In other words, the slot format indicator is transmitted through a PDCCH that is CRC-scrambled by a terminal-specific identifier (cell-RNTI (C-RNTI)) and another identifier (e.g., an SFI-RNTI). In some embodiments, the slot format identifier may include information on N slots, wherein the value of N may be an integer or a natural number greater than 0, or may be a value configured in the terminal by the base station through a higher layer signal from among a set of predefined possible values, such as 1, 2, 5, 10, and 20. A size of slot format indicator information may be configured in the terminal by the base station through a higher layer signal. An example of a slot format that may be indicated by the slot format indicator is shown in Table 3.

TABLE 3

| | Symbol number (or index) in one slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |

TABLE 3-continued

| Format | \multicolumn{14}{c}{Symbol number (or index) in one slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | D | D | D | D | D | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | X | U | U | U | D | X | X | U | U | U | U |
| 56 | D | X | U | U | U | U | U | D | X | U | U | U | U | U |
| 57 | D | D | D | D | X | X | U | D | D | D | X | X | X | U |
| 58 | D | D | X | X | U | U | U | D | X | X | U | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |
| 62-254 | \multicolumn{14}{c}{Reserved} |
| 255 | \multicolumn{14}{l}{UE determines the slot format for the slot based on tdd-UL-DL-ConfigurationCommon, tdd-UL-DL-ConfigurationCommand or tdd-UL-DL-ConfigDedicated and, if any, on detected DCI formats} |

In Table 3, D denotes downlink, U denotes uplink, and X denotes a flexible symbol. According to Table 3, the total number of supportable slot formats is 256. In a current NR system, a maximum size of a slot format indicator information bit is 128 bits, and the slot format indicator information bit is a value that may be configured in the terminal by the base station through a higher layer signal (e.g., dci-Payload-Size).

In some embodiments, the slot format indicator information may include a slot format for a plurality of serving cells, and a slot format for each serving cell may be distinguished based on a serving cell ID. A combination of slot format indicators (slot format combination) for one or more slots may be included in each serving cell. For example, when the size of the slot format indicator information bit is 3 bits and the slot format indicator information includes a slot format indicator for one serving cell, the 3-bit slot format indicator information may include a total of eight slot format indicators or a slot format indicator combination (hereinafter, a slot format indicator), and the base station may indicate one of the eight slot format indicators through terminal group-common control information (group-common DCI) (hereinafter, slot format indicator information).

In some embodiments, at least one of the eight slot format indicators may include a slot format indicator for a plurality of slots. For example, Table 4 shows an example of the 3-bit slot format indicator information including the slot format of Table 3. Five pieces of information (slot format combination IDs 0, 1, 2, 3, and 4) in the slot format indicator information are slot format indicators for one slot, and the remaining three are information on slot format indicators (slot format combination IDs 5, 6, and 7) for four slots, and may be sequentially applied to four slots.

TABLE 4

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

When PDSCH or PUSCH transmission/reception is performed in a plurality of slots through one PDCCH in an unlicensed band, PDSCH or PUSCH transmission/reception may need to be performed as shown in a or b of FIG. 4 in some cases. For example, when there is a gap between a PDSCH and/or a PUSCH as shown in a of FIG. 4, an additional channel access procedure may need to be performed, and thus continuous resource allocation as shown in b of FIG. 4 may be required. In contrast, when continuous resource allocation is performed as shown in b of FIG. 4, in the middle of N slots, another user may not perform user multiplexing, or downlink signal transmission such as low latency communication or synchronization signal transmission by using the unlicensed band, and thus resource allocation as shown in a of FIG. 4 may be required.

Accordingly, the present disclosure provides, when a base station and a terminal are configured to receive or transmit a PDSCH or a PUSCH in an unlicensed band, particularly, when the terminal configured to receive or transmit a PDSCH or a PUSCH scheduled through one PDCCH in a plurality of slots, a method of efficiently configuring and determining time-frequency resources of the PDSCH or the PUSCH received or transmitted in the plurality of slots. More particularly, the present disclosure provides a method and apparatus of determining (or changing or adjusting) time-frequency resources of the PDSCH or PUSCH received or transmitted in the plurality of slots according to a channel access procedure result of the base station or the terminal in the unlicensed band. Even when PDSCH reception or PUSCH transmission is configured in a plurality of slots through a plurality of PDCCHs, the method provided by embodiments of the present disclosure may be applied.

Hereinafter, a method and apparatus provided by an embodiment of the present disclosure are not limited to each embodiment, but a combination of all or some of one or more embodiments provided by the present disclosure may be used for a method and apparatus for configuring or determining time-frequency resources of a PDSCH or a PUSCH. Also, although an embodiment of the present disclosure is described on the assumption that a terminal is scheduled for PDSCH reception or PUSCH transmission from a base station through DCI, an embodiment of the present disclosure may also be applied to a case where a terminal is configured for PDSCH reception or PUSCH transmission from a base station through a higher layer signal configuration without receiving DCI like semi-persistent scheduling (SPS) or grant-free transmission. Further, although an embodiment of the present disclosure is described on the assumption that a base station and a terminal operate in an unlicensed band, a method and apparatus provided by an embodiment of the present disclosure may also be applied to a base station and a terminal operating in a licensed band or a shared band (shared spectrum) as well as an unlicensed band.

Also, although an embodiment of the present disclosure is described on the assumption that a PDSCH/PUSCH resource domain is determined by using slot format indicator information transmitted to a specific terminal or a terminal of a specific group through a PDCCH, a PDSCH/PUSCH resource domain may be determined by using slot format indicator information (or UL-DL-configuration information) transmitted to a terminal through a higher layer signal.

Also, an embodiment of the present disclosure is described on the assumption that a terminal transmits an uplink data channel (hereinafter, a PUSCH) to a base station, an embodiment of the present disclosure may also be applied to a case where a terminal receives a downlink data channel (hereinafter, a PDSCH) from a base station. Also, although an embodiment of the present disclosure is described on the assumption that a terminal receives one PDCCH, is scheduled for PUSCH transmission in a plurality of slots through one DCI or UL grant transmitted through the PDCCH, and performs PUSCH transmission, an embodiment of the present disclosure may also be applied to a terminal that performs PUSCH transmission in one slot through one DCI.

Embodiment 1

The present embodiment provides a method of determining a PDSCH/PUSCH resource domain, in a base station and a terminal operating in an unlicensed band. In particular, the present embodiment provides a method of determining a PDSCH/PUSCH resource domain, in a terminal or a base station receiving information on a channel occupancy time or slot format indicator information transmitted from the base station or the terminal. In this case, the terminal or the base station that does not receive the channel occupancy time or the slot format indicator information may determine the PDSCH/PUSCH resource domain according to DCI.

An operation of an embodiment will be described with reference to FIG. 5.

It is assumed that a base station and a terminal receive a signal in an unlicensed band, and the terminal is configured to perform PUSCH transmission in a plurality of slots through one DCI. That is, the terminal may monitor or detect DCI in a CORESET or a search space (hereinafter, a PDCCH reception region) configured through a higher layer signal, and may determine whether the DCI schedules PUSCH transmission through the detected DCI. Also, the terminal determines the number N1 of scheduled PUSCH transmission slots, PUSCH transmission slot offset information K1, allocation information of a PUSCH frequency resource domain 510, and allocation information of a time resource domain 515 through the DCI.

Figure 5:
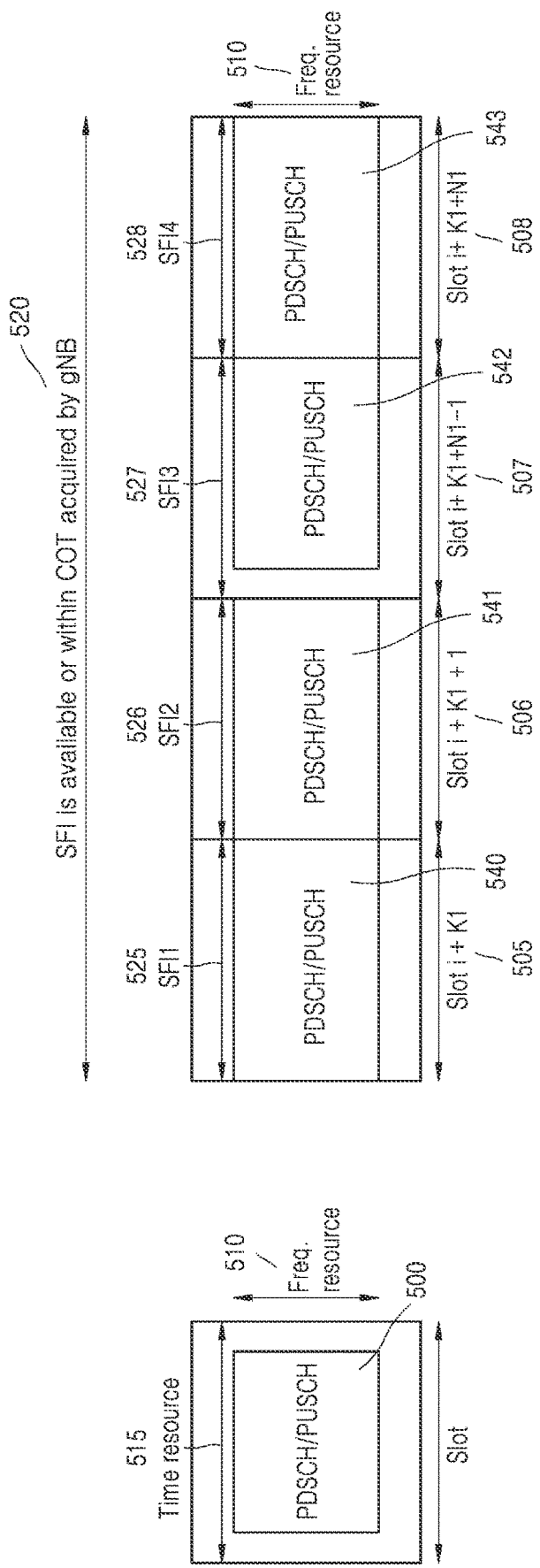
FIG. 5 is a diagram for describing a method of determining a resource domain, according to some embodiments of the present disclosure.

For example, in FIG. 5, the terminal may be configured to schedule PUSCH transmission for four slots (N1=4) through the DCI received in a configured PDCCH reception region 500, and may determine that slots configured for PUSCH transmission are a slot i+K1 505, a slot i+K1+1 506, a slot i+K1+N1−1 507, and a slot i+K1+N1 508 through the PUSCH transmission slot offset information K1. In this case, the terminal needs a method of determining a PUSCH transmission resource domain for a plurality of scheduled slots by using information of the frequency resource domain 510 and the time resource domain 515 for PUSCH transmission included in the DCI. In order to minimize unnecessary information of the DCI, it may be determined that time-frequency resource domain information for the plurality of slots is equally applied to the frequency resource domain 510 and the time resource domain 515 transmitted through the DCI.

In general, because an average moving speed of the terminal is not high, a frequency resource domain for the plurality of slots may be equally allocated to one frequency resource domain 510 included in the DCI. However, in the case of a time resource domain, it is preferable that time resource domain information is changed or adjusted according to channel occupancy time information (hereinafter, slot format indicator information) received by the terminal from the base station for a slot scheduled for PUSCH transmission.

For example, when the terminal receives slot format indicator information for i+K1+N1 in the slot i+k1 and the received slot format indicator indicates that at least one symbol is a downlink symbol, the terminal may change PUSCH time resource domain information to perform PUSCH transmission in a symbol other than the downlink symbol, so that the base station transmits a downlink signal such as downlink control signal or a downlink control channel That is, the terminal may determine PUSCH transmission time resource domain information for at least one of slots configured for PUSCH transmission according to the received slot format indicator information. A more detailed method will be described as follows.

Method 1: A method of determining a PUSCH transmission resource domain according to a received slot format indicator for a slot configured for PUSCH transmission In Method 1, when the terminal receives or knows slot format indicator information 520 for N1 scheduled or configured PUSCH transmission slots, the terminal determines a PUSCH transmission resource domain according to the slot format indicator information 520. In other words, regarding a PUSCH transmission time resource domain in a slot scheduled for PUSCH transmission, the terminal may determine that a symbol indicated as an uplink symbol is the PUSCH transmission time resource domain according to slot format indicator information indicated for each slot.

In some embodiments, the terminal may determine that a symbol indicated as a flexible symbol is a PUSCH transmission time resource domain according to the slot format indicator information indicated for each PUSCH transmission slot.

Also, a method of determining a PUSCH transmission time resource domain for a flexible symbol may vary according to a transmission channel through which slot format indicator information is received. In detail, it may be determined that a symbol indicated as a flexible symbol is a PUSCH transmission time resource domain in slot format indicator information (or uplink-downlink configuration information) indicated through a higher layer signal such as a system information block (SIB) or radio resource control (RRC) signal, and it may be determined that a symbol indicated as a downlink symbol or a flexible symbol is not a PUSCH transmission time resource domain in slot format indicator information indicated through a PDCCH. However, the present disclosure is not limited thereto.

Also, in some embodiments, because it takes a certain time for the terminal to receive slot format indicator information, decode the slot format indicator information, and obtain information, a criterion for determining whether the slot format indicator information is received, known, or valid may be required. For example, the base station and the terminal may correctly receive slot format indicator information after an X symbol or time from a last symbol of a PDCCH through which the slot format indicator information is transmitted, and may determine that the received slot format indicator information is valid.

In some embodiments, the X symbol or time may be a minimum processing time N2 required for the terminal to receive DCI for scheduling PUSCH transmission from the base station and start the scheduled PUSCH transmission. The terminal may transmit information (UE capability) on the processing time N2 to the base station according to a base station request or an initial access procedure so that the base station knows the processing time of the terminal. For PUSCH transmission or a slot transmitted within the processing time N2 from the last symbol of the PDCCH through which the slot format indicator is transmitted, the terminal may determine that the slot format indicator information is not received or is not known, or there is no valid slot format indicator information.

Determining validity of the slot format indicator by using the processing time N2 is merely an example, and the terminal may receive DCI for scheduling PDSCH transmission from the base station, may receive a scheduled PDSCH, and may consider a minimum processing time N1 required to start HARQ-ACK transmission for the received PDSCH or a time obtained by adding an additional offset symbol or time to the processing time N1 or N2 or symbol.

Referring to FIG. 5, when the terminal scheduled for PUSCH (540, 541, 542, 543) transmission in the slots+K1 505, i+K1+1 506, i+K1+N1−1 507, and i+K1+N1 508 receives and knows slot format indicator information 525, 526, 527, and 528 for the slots 505, 506, 507, and 508 scheduled for PUSCH transmission, the terminal may determine or change PUSCH time resource domain information in the slots i+K1 505, i+K1+1 506, i+K1+N1−1 507, and i+K1+N1 508 according to slot format indicator information for each slot.

For example, when the slot format indicator information for the slots i+K1 505, i+K1+1 506, i+K1+N1−1 507, and i+K1+N1 508 received by the terminal is formats 1, 1, 10, and 1 of Table 3, the terminal may determine that a symbol indicated as an uplink symbol is a PUSCH transmission time resource domain in a slot format in which a PUSCH (540, 541, 542, 543) start symbol and length or start symbol and end symbol locations in each slot are indicated for each slot. Format 1 of Table 3 is a slot format when one slot includes only uplink symbols, and format 10 is a format when a first symbol of a slot is a flexible symbol and remaining symbols are all uplink symbols.

In more detail, regarding the PUSCH 540 in the slot i+k1 505 scheduled for PUSCH transmission, the terminal may determine that a first symbol to a last symbol of the slot i+k1 505 are PUSCH transmission time resource domains in the slot i+K1 505 according to uplink symbol information indicated in the slot format indicator information 525 (format 1) for the slot i+K1 505. Also, regarding the PUSCH 541 in the slot i+K1+1 506 scheduled for PUSCH transmission, the terminal determines that a first symbol to a last symbol of the slot i+K1+1 506 are PUSCH transmission time resource domains according to uplink symbol information indicated in the slot format indicator information 526 (format 1) for the slot i+K1+1 506. Also, regarding the PUSCH 542 in the slot i+K1+N1−1 507 scheduled for PUSCH transmission, the terminal determines that a second symbol to a last symbol of the slot i+K1+N1−1 507 are PUSCH transmission time resource domains according to uplink symbol information indicated in the slot formation indicator information 527 (format 10) for the slot i+K1+N1−1 507. Also, regarding the PUSCH 543 in the slot i+K1+N1 508 scheduled for PUSCH transmission, the terminal determines that a first symbol to a last symbol of the slot i+K1+N1 508 are PUSCH transmission time resource domains according to uplink symbol information indicated in the slot format indicator information 528 (format 1) for the slot i+K1+N1 508.

Also, in some embodiments, for PUSCH transmission or a slot transmitted after the processing time N2 from a last symbol of a PDCCH through which a slot format indicator is transmitted, the terminal may determine and change a PUSCH time resource domain according to the slot format indicator as described above; and for PUSCH transmission or a slot transmitted within the processing time N2 from a last symbol of a PDCCH in which a slot format indicator is transmitted, the terminal may determine that slot format indicator information is not received or is not known, or there is no valid slot format indicator information, and may perform PUSCH transmission by using a pre-determined PUSCH time resource domain. Because Method 1 may change or adjust a pre-configured scheduling time resource domain according to a slot format indicator transmitted by the base station or the terminal, a transmission device connected to an unlicensed band through a channel access procedure may flexibly use its own channel occupancy time or may support user multiplexing.

Embodiment 2

The present embodiment provides a method of determining a PDSCH/PUSCH resource domain, in a base station and a terminal operating in an unlicensed band. In particular, the present embodiment provides another method of determining a PDSCH/PUSCH resource domain, in a terminal or a base station receiving information on a channel occupancy time or slot format indicator information transmitted from the base station or the terminal. The terminal or the base station that does not receive the channel occupancy time or the slot format indicator information may determine the PDSCH/PUSCH resource domain according to DCI.

An operation of an embodiment will be described with reference to FIG. 6.

It is assumed that a base station and a terminal receive a signal in an unlicensed band, and the terminal is configured to perform PUSCH transmission in a plurality of slots through one DCI. That is, the terminal may monitor or detect DCI in a CORESET or search space (hereinafter, a PDCCH reception region) configured through a higher layer signal, and may determine whether the DCI schedules PUSCH transmission through the detected DCI. Also, the terminal determines the number N1 of scheduled PUSCH transmission slots, PUSCH transmission slot offset information K1, allocation information of a PUSCH frequency resource domain 610, and allocation information of a time resource domain 615 through the DCI.

Figure 6:
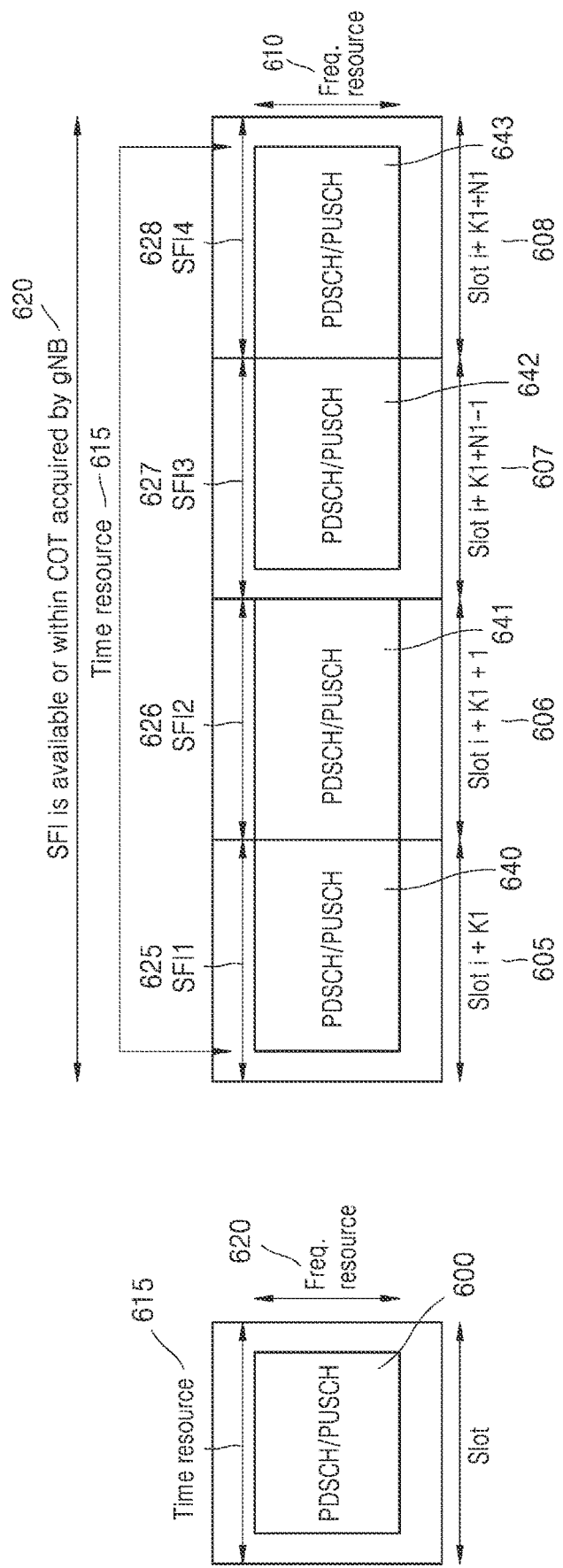
FIG. 6 is a diagram for describing a method of determining a resource domain, according to some embodiments of the present disclosure.

For example, in FIG. 6, the terminal may be configured to schedule PUSCH transmission for four slots (N1=4) through the DCI received in a configured PDCCH reception region 600, and may determine that slots configured for PUSCH transmission are a slot i+K1 605, a slot i+K1+1 606, a slot i+K1+N1−1 607, and a slot i+K1+N1 608 through the PUSCH transmission slot offset information K1. In this case, the terminal needs a method of determining a PUSCH transmission resource domain for a plurality of scheduled slots by using the frequency resource domain 610 and the time resource domain 615 for PUSCH transmission included in the DCI. In order to minimize unnecessary information of the DCI, it may be determined that time-frequency resource domain information for the plurality of slots is equally applied to the frequency resource domain 610 and the time resource domain 615 transmitted through the DCI.

In general, because an average moving speed of the terminal is not high, a frequency resource domain for the plurality of slots may be equally allocated to one frequency resource domain 610 included in the DCI. However, in the case of a time resource domain, it is preferable that time resource domain information is changed or adjusted according to channel occupancy time information (hereinafter, slot format indicator information) received by the terminal from the base station for a slot scheduled for PUSCH transmission.

For example, when the terminal receives slot format indicator information for i+K1+N1 in the slot i+k1 and the received slot format indicator indicates that at least one symbol is a downlink symbol, the terminal may change PUSCH time resource domain information to perform PUSCH transmission in a symbol other than the downlink symbol, so that the base station transmits a downlink signal such as downlink control signal or a downlink control channel That is, the terminal may determine PUSCH transmission time resource domain information for at least one of slots configured for PUSCH transmission according to the received slot format indicator information. A more detailed method will be described as follows.

Referring to FIG. 6, another method by which the terminal receiving slot format indicator information for the slot i+K1+N1 608 in the slot i+k1 605 determines time resource domain information for at least one of N1 slots configured for PUSCH transmission according to the received slot format indicator information will be described as follows.

Method 2: A method by which, from among slots scheduled or configured for PUSCH transmission, a PUSCH transmission start symbol in a first slot and a PUSCH transmission end symbol in a last slot follow DCI, and a PUSCH transmission time resource domain is determined according to received slot format indicator information for a remaining slot other than the slots.

Method 2 will be described with reference to FIG. 6. In Method 2, when the terminal receives or knows slot format indicator information 620 for N1 scheduled or configured PUSCH transmission slots, from among slots scheduled for PUSCH transmission, a PUSCH transmission start symbol in the first slot 605 and a PUSCH transmission end symbol in the last slot 608 follow DCI, and the terminal determines a PUSCH transmission time resource domain according to received slot format indicator information 626 and 627 for the slots 606 and 607 other than the first slot 605 and the last slot 608.

In other words, regarding a PUSCH transmission time resource domain in a remaining slot other than the first slot 605 and the last slot 608 from among slots scheduled for PUSCH transmission, the terminal may determine that a symbol indicated as an uplink symbol is the PUSCH transmission time resource domain according to slot format indicator information indicated for each slot. In this case, the terminal may determine that a symbol indicated as a flexible symbol according to the slot format indicator information for each slot.

Also, in some embodiments, a method of determining a PUSCH transmission time resource domain for a flexible symbol may vary according to a transmission channel through which slot format indicator information is received. In detail, it may be determined that a symbol indicated as a flexible symbol is a PUSCH transmission time resource domain in slot format indicator information (or uplink-downlink configuration information) indicated through a higher layer signal such as an SIB or RRC signal, and it may be determined that a symbol indicated as a flexible symbol is not a PUSCH transmission time resource domain in slot format indicator information indicated through a PDCCH. However, the present disclosure is not limited thereto.

Also, in some embodiments, because it takes a certain time for the terminal to receive slot format indicator information, decode the slot format indicator information, and obtain information, a criterion for determining whether the slot format indicator information is received, known, or valid may be required. For example, the base station and the terminal may correctly receive slot format indicator information after an X symbol or time from a last symbol of a PDCCH through which the slot format indicator information is transmitted, and may determine that the received slot format indicator information is valid.

In some embodiments, the X symbol or time may be a minimum processing time N2 required for the terminal to receive DCI for scheduling PUSCH transmission from the base station and start the scheduled PUSCH transmission. The terminal may transmit information (UE capability) on the processing time N2 to the base station according to a base station request or an initial access procedure so that the base station knows the processing time of the terminal. For PUSCH transmission or a slot transmitted within the processing time N2 from the last symbol of the PDCCH through which the slot format indicator is transmitted, the terminal may determine that the slot format indicator information is not received or is not known, or there is no valid slot format indicator information.

Determining validity of the slot format indicator by using the processing time N2 is merely an example, and the terminal may receive DCI for scheduling PDSCH transmission from the base station, may receive a scheduled PDSCH, and may consider a minimum processing time N1 required to start HARQ-ACK transmission for the received PDSCH or a time obtained by adding an additional offset symbol or time to the processing time N1 or N2 or symbol.

In more detail, referring to FIG. 6, when the terminal scheduled for PUSCH (640, 641, 642, 643) transmission in the slots i+K1 605, i+K1 606, i+K1+N1−1 607, and i+K1+N1 608 receives and knows slot format indicator information 625, 626, 627, and 628 for the slots 605, 606, 607, and 608 scheduled for PUSCH transmission, or receives and knows the slot format indicator information 626 and 627 for at least the slots 606 and 607 other than the first slot 605 to the last slot 608 from among the slots 605, 606, 607, and 608 scheduled for PUSCH transmission, from among PUSCH time resource domain information in the slots i+K1 605, i+K1 606, i+K1+N1−1 607, and i+K1+N1 608, for a PUSCH transmission start symbol in the first slot 605, the terminal may determine time resource domain information of the PUSCH 640 according to start symbol information of the time resource domain 615 of the DCI, and for a PUSCH transmission end symbol in the last slot 608, the terminal may determine time resource domain information of the PUSCH 643 according to length information or end symbol information of the time resource domain 615 of the DCI. For the remaining slots 606 and 607 other than the first slot 605 and the last slot 608 from among the slots scheduled for PUSCH transmission, the terminal may determine time resource domain information of the PUSCH 641 and the PUSCH 642 according to the slot format indicator information 626 and 627 received for each slot like in Method 1.

In more detail, when format indicator information for the slots i+K1 605, i+K1 606, i+K1+N1−1 607, and i+K1+N1 608 received by the terminal is formats 1, 1, 10, and 1 of Table 3, the terminal may determine that a symbol indicated as an uplink symbol is a PUSCH transmission time resource domain in a slot format in which a PUSCH (641, 642) start symbol and length or start symbol and end symbol locations in the slots 606 and 607 other than the first slot 605 and the last slot 608 are indicated for each slot. Format 1 of Table 3 is a slot format when one slot includes only uplink symbols, and format 10 is a format when a first symbol of a slot is a flexible symbol and remaining symbols are all uplink symbols.

In more detail, the terminal may determine the PUSCH 640 in the first slot i+K1 605 of the slots scheduled for PUSCH transmission based on a PUSCH transmission start symbol indicated by the DCI. Although the slot format indicator information 625 for the first slot 605 indicates format 1, the terminal determines that PUSCH transmission start symbol information indicated by the DCI (e.g., PUSCH transmission from a second symbol) to a last symbol of the slot i+K1 605 are time resource domains of the PUSCH 640 in the first slot 605.

Also, regarding the PUSCH 641 in the slot i+K1+1 606 scheduled for PUSCH transmission, the terminal determines that a first symbol to a last symbol of the slot i+K1+1 606 are PUSCH transmission time resource domains according to uplink symbol information indicated in the slot format indicator information 626 (format 1) for the slot i+K1+1 606.

Also, regarding the PUSCH 642 in the slot i+K1+N1−1 607 scheduled for PUSCH transmission, the terminal determines that a second symbol to a last symbol of the slot i+K1+N1−1 607 are PUSCH transmission time resource domains according to uplink symbol information indicated in the slot format indicator information 627 (format 10) for the slot i+K1+N1−1 607.

Also, the terminal may determine the PUSCH 643 in the last slot i+K1+N1 608 of the slots scheduled for PUSCH transmission based on a PUSCH transmission end symbol indicated by the DCI. Although a slot format indicator for the last slot 608 indicates 1, the terminal may determine a PUSCH transmission time resource domain in the last slot 608 according to PUSCH transmission length or end symbol information indicated by the DCI.

Because Method 2 uses pre-scheduled scheduling information, Method 2 enables unique resource allocation to a specific terminal when compared to slot format indicator information equally transmitted to a plurality of terminals. Also, because a pre-configured scheduling time resource domain may be changed or adjusted according to a slot format indicator transmitted by the base station or the terminal, a transmission device connected to an unlicensed band through a channel access procedure may flexibly use its own channel occupancy time or may support user multiplexing.

Embodiment 3

The present embodiment provides a method of determining a PDSCH/PUSCH resource domain, in a base station and a terminal operating in an unlicensed band. In particular, the present embodiment provides a method of determining a PDSCH/PUSCH resource domain, in a terminal or a base station receiving information on a channel occupancy time, for example, a slot format indicator, transmitted from the base station or terminal and a method by which a terminal or a base station that does not receive information on a channel occupancy time determines a PDSCH/PUSCH resource domain according to DCI.

Figure 7:
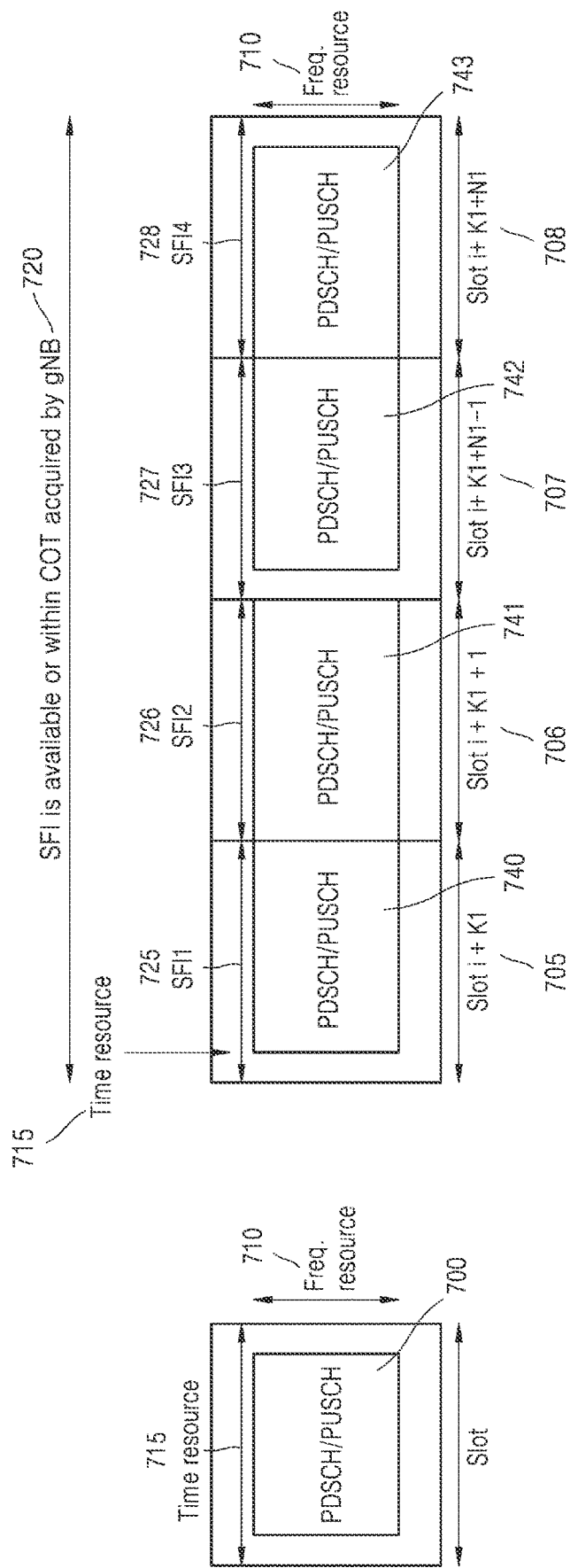
FIG. 7 is a diagram for describing a method of determining a resource domain, according to some embodiments of the present disclosure.

Referring to FIG. 7, another method by which the terminal receiving slot format indicator information for i+K1+N1 708 in a slot i+K1 705 determines time resource domain information for at least one of N1 slots configured for PUSCH transmission according to the received slot format indicator information will be described as follows.

Method 3: A method by which, from among slots configured for PUSCH transmission, a PUSCH transmission start symbol in a first slot follows DCI, and a PUSCH transmission time resource domain is determined according to received slot format indicator information for the slot for PUSCH transmission in a remaining slot other than the first slot.

Method 3 will be described with reference to FIG. 7. In Method 3, when the terminal receives or knows slot format indicator information 720 for N1 scheduled or configured PUSCH transmission slots, from among slots scheduled for PUSCH transmission, a PUSCH transmission start symbol in the first slot 705 follows DCI, and the terminal determines a PUSCH transmission time resource domain according to received slot format indicator information 726, 272, and 728 for slots 706, 707, and 708 other than the first slot 705. A PUSCH transmission end symbol in the first slot 705 may be determined according to slot format indicator information 725 for the slot 705. The PUSCH transmission end symbol in the first slot 705 may be determined to be up to a last symbol of the first slot 705.

In other words, when the terminal scheduled for PUSCH (740, 741, 742, 743) transmission in the slots i+K1 705, i+K1 706, i+K1+N1−1 707, and i+K1+N1 708 receives and knows the slot format indicator information 725, 726, 727, and 728 for the slots 705, 706, 707, and 708 scheduled for PUSCH transmission, or receives and knows the slot format indicator information 726, 727, and 728 for at least the slots 706, 707, and 708 other than the first slot 705 from among the slots 705, 706, 707, and 708 scheduled for PUSCH transmission, from among PUSCH time resource domain information in the slots i+K1 705, i+K1 706, i+K1+N1−1 707, and i+K1+N1 708, for the PUSCH transmission start symbol in the first slot 705, the terminal may determine time resource domain information of the PUSCH 740 according to start symbol information of a time resource domain 715 of the DCI.

For the remaining slots 706, 707, and 708 other than the first slot 705 from among the slots scheduled for PUSCH transmission, the terminal may determine time resource domain information of the PUSCHs 741, 742, and 742 according to the slot format indicator information 726, 727, and 728 received for each slot like in Method 1. Also, the PUSCH transmission end symbol in the first slot 705 may be determined according to the slot format indicator information 725 for the first slot 705.

When the terminal does not receive or does not know the slot format indicator information 125 for the first slot 705, the terminal may determine that the PUSCH transmission end symbol in the first slot 705 is up to a last symbol of the first slot 705. In some embodiments, even when the terminal receives and knows the slot format indicator information 725 for the first slot 705, the terminal may determine that the PUSCH transmission end symbol in the first slot 705 is up to a last symbol of the first slot 705. Also, the terminal may determine that a symbol indicated as a flexible symbol is a PUSCH transmission time resource domain according to slot format indicator information indicated for the first slot 705.

Also, in some embodiments, a method of determining a PUSCH transmission time resource domain for a flexible symbol may vary according to a transmission channel through which slot format indicator information is received. In detail, it may be determined that a symbol indicated as a flexible symbol is a PUSCH transmission time resource domain in slot format indicator information (or uplink-downlink configuration information) indicated through a higher layer signal such as an SIB or RRC signal, and it may be determined that a symbol indicated as a flexible symbol is not a PUSCH transmission time resource domain in slot format indicator information indicated through a PDCCH. However, the present disclosure is not limited thereto.

Also, in some embodiments, because it takes a certain time for the terminal to receive slot format indicator information, decode the slot format indicator information, and obtain information, a criterion for determining whether the slot format indicator information is received, known, or valid may be required. For example, the base station and the terminal may correctly receive slot format indicator information after an X symbol or time from a last symbol of a PDCCH through which the slot format indicator information is transmitted, and may determine that the received slot format indicator information is valid.

In some embodiments, the X symbol or time may be a minimum processing time N2 required for the terminal to receive DCI for scheduling PUSCH transmission and start the scheduled PUSCH transmission. The terminal may transmit information (UE capability) on the processing time N2 to the base station according to a base station request or an initial access procedure so that the base station knows the processing time of the terminal. For PUSCH transmission or a slot transmitted within the processing time N2 from the last symbol of the PDCCH through which the slot format indicator is transmitted, the terminal may determine that the slot format indicator information is not received or is not known, or there is no valid slot format indicator information.

Determining validity of the slot format indicator by using the processing time N2 is merely an example, and the terminal may receive DCI for scheduling PDSCH transmission from the base station, may receive a scheduled PDSCH, and may consider a minimum processing time N1 required to start HARQ-ACK transmission for the received PDSCH or a time obtained by adding an additional offset symbol or time to the processing time N1 or N2 or symbol.

In more detail, referring to FIG. 7, when the slot format indicator information for the slots i+K1 705, i+K1 706, i+K1+N1−1 707, and i+K1+N1 708 received by the terminal is formats 1, 1, 10, and 1 of Table 3, the terminal may determine that a symbol indicated as an uplink symbol is a PUSCH transmission time resource domain in a slot format in which a PUSCH (741, 742, 743) start symbol and length or start symbol and end symbol locations in the slots 706, 707, and 708 other than the first slot 705 are indicated for each slot. Format 1 of Table 3 is a slot format when one slot includes only uplink symbols, and format 10 is a format when a first symbol of a slot is a flexible symbol and remaining symbols are all uplink symbols.

In more detail, the terminal may determine the PUSCH 740 in the first slot i+K1 705 of the slots scheduled for PUSCH transmission based on a PUSCH transmission start symbol indicated by the DCI. Although the slot format indicator information 725 for the first slot 705 indicates format 1, the terminal determines that PUSCH transmission start symbol information indicated by the DCI (e.g., PUSCH transmission from a second symbol) to a last symbol of the slot i+K1 705 are time resource domains of the PUSCH 740 in the first slot 705.

Also, regarding the PUSCH 741 in the slot i+K1+1 706 scheduled for PUSCH transmission, the terminal determines that a first symbol to a last symbol of the slot i+K1+1 706 are PUSCH transmission time resource domains according to uplink symbol information indicated by the slot format indicator information 726 (format 1) for the slot i+K1+1 706.

Also, regarding the PUSCH 742 in the slot i+K1+N1−1 707 scheduled for PUSCH transmission, the terminal determines that a second symbol to a last symbol of the slot i+K1+N1−1 707 are PUSCH transmission time resource domains according to uplink symbol information indicated by the slot format indicator information 727 (format 10) for the slot i+K1+N1−1 707.

Also, regarding the PUSCH 743 in the slot i+K1+N1 708 scheduled for PUSCH transmission, the terminal determines that a first symbol to a last symbol of the slot i+K1+N1 708 are PUSCH transmission time resource domains according to uplink symbol information indicated by the slot format indicator information 728 (format 1) for the slot i+K1+N1 708.

Because Method 3 uses pre-scheduled scheduling information, Method 3 enables unique resource allocation to a specific terminal when compared to slot format indicator information equally transmitted to a plurality of terminals. Also, because a pre-configured scheduling time resource domain may be changed or adjusted according to a slot format indicator transmitted by the base station or the terminal, a transmission device connected to an unlicensed band through a channel access procedure may flexibly use its own channel occupancy time or may support user multiplexing.

Embodiment 4

Embodiment 4 provides a method of determining a PDSCH/PUSCH resource domain, in a base station and a terminal operating in an unlicensed band. In particular, according to the present embodiment, a method of determining a PDSCH/PUSCH resource domain, in a terminal or a base station receiving information on a channel occupancy time, for example, a slot format indicator, transmitted from the base station or the terminal, and a method by which a terminal or a base station that does not receive information on a channel occupancy time determines a PDSCH/PUSCH resource domain may be different.

Figure 8:
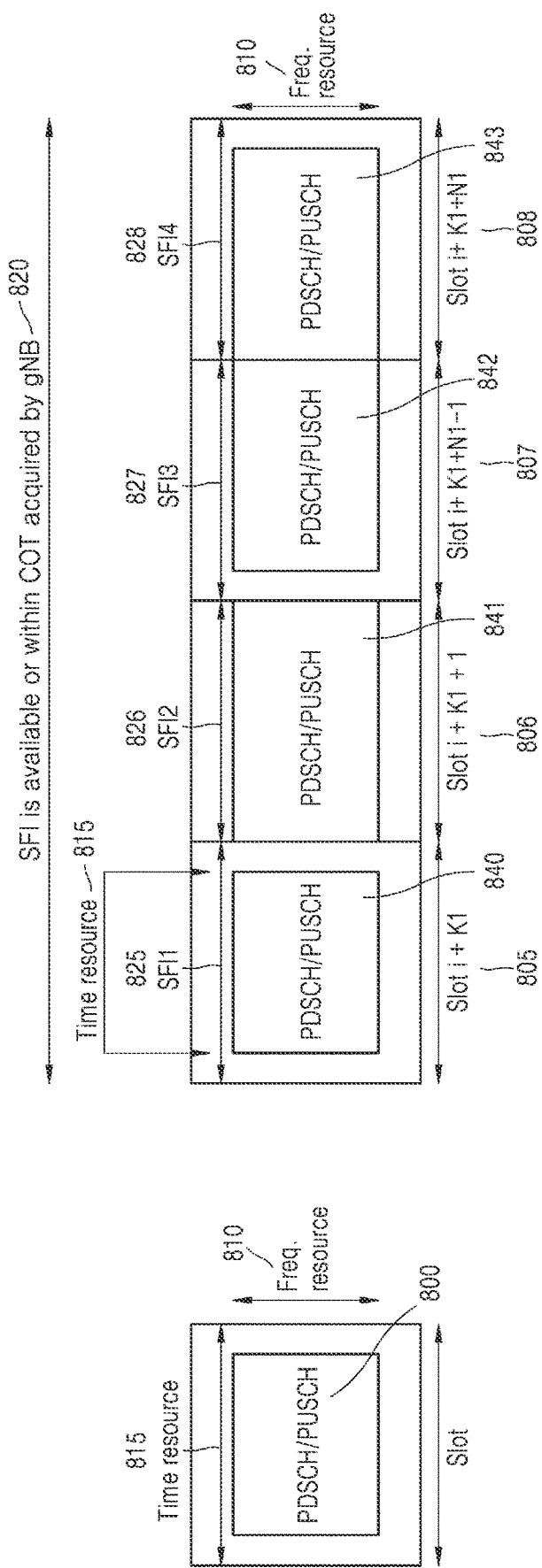
FIG. 8 is a diagram for describing a method of determining a resource domain, according to some embodiments of the present disclosure.

Referring to FIG. 8, another method by which the terminal receiving slot format indicator information for a slot i+K1+N1 808 in a slot i+K1 805 determines time resource domain information for at least one slot of N1 slots configured for PUSCH transmission according to the received slot format indicator information will be described as follows.

Method 4: A method by which, from among slots configured for PUSCH transmission, a PUSCH transmission start symbol and a PUSCH transmission end symbol in a first slot follow DCI, and a PUSCH transmission time resource domain for a remaining slot other than the first slot is determined according to received slot format indicator information.

Method 4 will be described with reference to FIG. 8. In Method 4, when the terminal receives or knows slot format indicator information 820 for N1 scheduled or configured PUSCH transmission slots, from among slots scheduled for PUSCH transmission, a PUSCH transmission start symbol and a PUSCH transmission end symbol in the first slot 805 follow DCI, and the terminal determines a PUSCH transmission time resource domain according to received slot format indicator information 826, 872, and 828 for slots 806, 807, and 808 other than the first slot 805.

In other words, when the terminal scheduled for PUSCH (840, 841, 842, 843) transmission in the slots i+K1 805, i+K1 806, i+K1+N1−1 807, and i+K1+N1 808 receives and knows the slot format indicator information 825, 826, 827, and 828 for the slots 805, 806, 807, and 808 scheduled for PUSCH transmission, or receives and knows the slot format indicator information 826, 827, and 828 for at least the slots 806, 807, and 808 other than the first slot 805 from among the slots 805, 806, 807, and 808 scheduled for PUSCH transmission, from among PUSCH time resource domain information in the slots i+K1 805, i+K1 806, i+K1+N1−1 807, and i+K1+N1 808, for the PUSCH transmission start symbol and the PUSCH transmission end symbol in the first slot 805, the terminal may determine time resource domain information of the PUSCH 840 according to information of a time resource domain 815 of the DCI.

The remaining slots 806, 807, and 808 other than the first slot 805 from among the slots scheduled for PUSCH transmission, the terminal may determine time resource domain information of the PUSCHs 841, 842, and 842 according to the slot format indicator information 826, 827, and 828 received for each slot like in Method 1.

In more detail, when the slot format indicator information for the slots i+K1 805, i+K1 806, i+K1+N1−1 807, and i+K1+N1 808 received by the terminal is formats 1, 1, 10, and 1 of Table 3, the terminal may determine that a symbol indicated as an uplink symbol is a PUSCH transmission time resource domain in a slot format in which a PUSCH (841, 842, 843) start symbol and length or start symbol and end symbol locations in the slots 806, 807, and 808 other than the first slot 805 are indicated for each slot. Format 1 of Table 3 is a slot format when one slot includes only uplink symbols, and format 10 is a format when a first symbol of a slot is a flexible symbol and remaining symbols are all uplink symbols.

In more detail, the terminal may determine the PUSCH 840 in the first slot i+K1 805 of the slots scheduled for PUSCH transmission based on a PUSCH transmission start symbol and a PUSCH transmission end symbol (or transmission length) indicated by the DCI. Although the slot format indicator information 825 for the first slot 805 indicates format 1, the terminal determines that PUSCH transmission time domain information indicated by the DCI (e.g., PUSCH transmission from a second symbol to a 13$^{th}$ symbol of the slot i+K1 805) is a resource domain of the PUSCH 840 in the first slot 805.

Also, regarding the PUSCH 841 in the slot i+K1+1 806 scheduled for PUSCH transmission, the terminal determines that a first symbol to a last symbol of the slot i+K1+1 806 are PUSCH transmission time resource domains according to uplink symbol information indicated by the slot format indicator information 826 (format 1) for the slot i+K1+1 806.

Also, regarding the PUSCH 842 in the slot i+K1+N1−1 807 scheduled for PUSCH transmission, the terminal determines that a second symbol to a last symbol of the slot i+K1+N1−1 807 are PUSCH transmission time resource domains according to uplink symbol information indicated by the slot format indicator information 827 (format 10) for the slot i+K1+N1−1 807.

Also, regarding the PUSCH 843 in the slot i+K1+N1 808 scheduled for PUSCH transmission, the terminal determines that a first symbol to a last symbol of the slot i+K1+N1 808 are PUSCH transmission time resource domains according to uplink symbol information indicated by the slot format indicator information 828 (format 1) for the slot i+K1+N1 808.

Because Method 4 uses pre-scheduled scheduling information in at least a first slot, pre-configured scheduling information may be used in at least one slot. Also, a pre-configured scheduling time resource domain may be changed or adjusted according to a slot format indicator transmitted by the base station or the terminal, a transmission device connected to an unlicensed band through a channel access procedure may flexibly use its own channel occupancy time or may support user multiplexing.

Embodiment 5

The present embodiment provides a method of determining a PDSCH/PUSCH resource domain, in a base station and a terminal operating in an unlicensed band. In particular, a method by which a terminal or a base station that does not receive information on a channel occupancy time, for example, a slot format indicator, transmitted from the base station or the terminal determines a PDSCH/PUSCH resource domain will be described as follows. In more detail, a method of determining a PUSCH transmission time resource domain when the terminal does not receive or does not know slot format indicator information for N1 scheduled or configured PUSCH transmission slots is as follows.

Method 5: A method of determining a PUSCH transmission time resource domain by applying time resource domain information included in DCI for scheduling PUSCH transmission to N1 PUSCH transmission slots In Method 5, when the terminal does not receive or does not know slot format indicator information for scheduled or configured PUSCH transmission slots, the terminal determines a PUSCH transmission time resource domain by applying time resource domain information included in DCI for scheduling PUSCH transmission to each of N1 PUSCH transmission slots as shown in a of FIG. 9.

Figure 9:
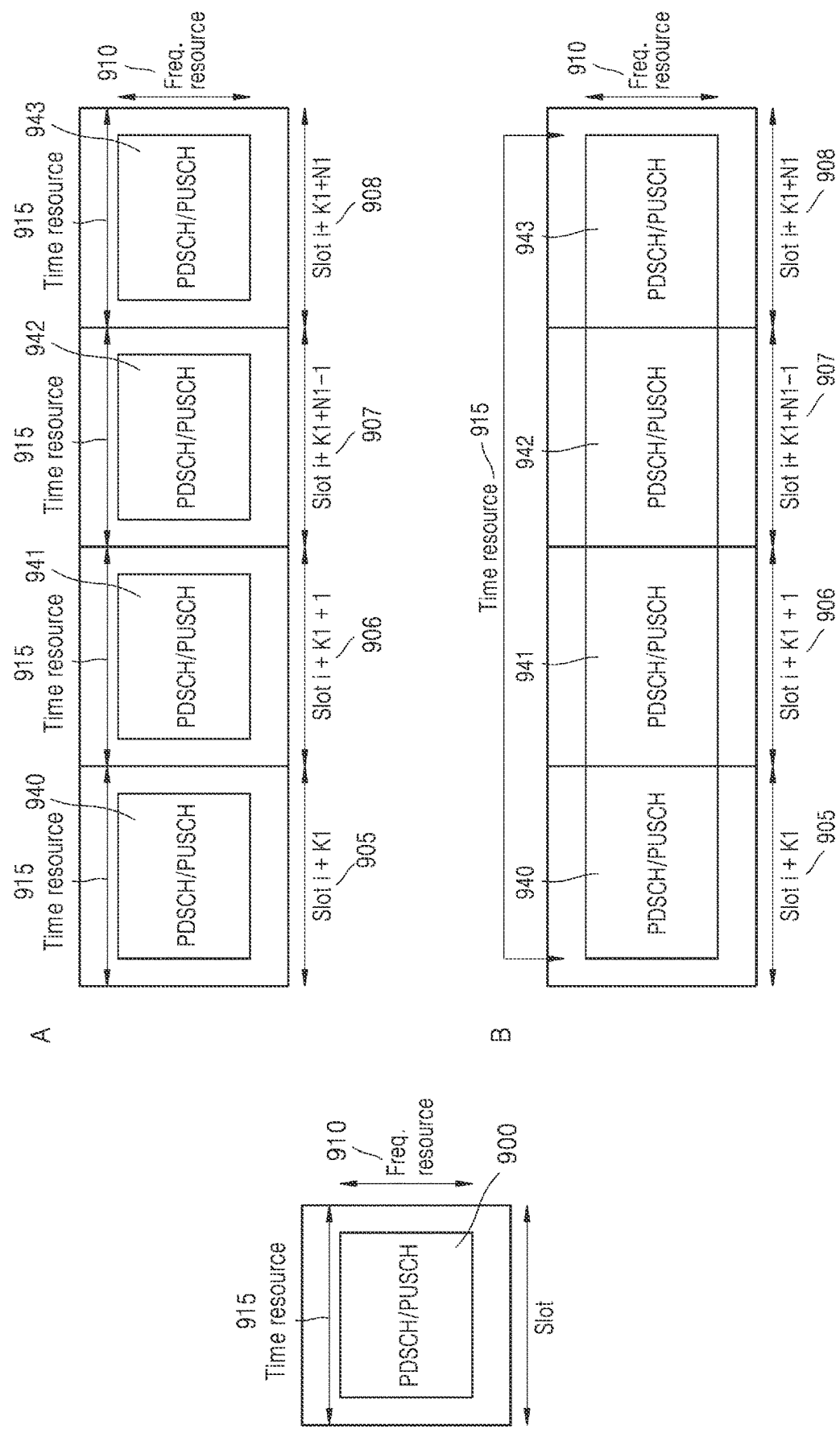
FIG. 9 is a diagram for describing a method of determining a resource domain, according to some embodiments of the present disclosure.

Referring to a of FIG. 9, the terminal may determine a PUSCH transmission resource in slots i+K1 905, i+K1+1 906, i+K1+N1−1 907, and i+K1+N1 908 configured for PUSCH transmission by using time domain resource allocation information 915 included in the DCI for scheduling PUSCH transmission. That is, a PUSCH transmission time resource in the slots i+K1 905, i+K1+1 906, i+K1+N1−1 907, and i+K1+N1 908 is the same as a PUSCH 940.

In Method 5, when the terminal does not receive or does not know slot format indicator information for scheduled or configured PUSCH transmission slots, because time resource domain information included in DCI for scheduling PUSCH transmission is applied to each of N1 PUSCH transmission slots, a base station or another terminal in the N1 PUSCH transmission slots may perform a channel access procedure, thereby making it possible to more flexibly use an unlicensed band or facilitate multiplexing of the terminal or the base station.

Embodiment 6

The present embodiment provides a method of determining a PDSCH/PUSCH resource domain, in a base station and a terminal operating in an unlicensed band. In particular, a method by which a base station or a terminal that does not receive information on a channel occupancy time, for example, a slot format indicator or information on a channel occupancy time, transmitted by the base station or the terminal determines a PDSCH/PUSCH resource domain is as follows. In more detail, another method of determining a PUSCH transmission time resource domain when the terminal does not receive or does not know slot format indicator information for N1 scheduled or configured PUSCH transmission slots is as follows.

Method 6: A method by which, a PUSCH transmission start symbol in a first slot from among PUSCH transmission slots follows PUSCH transmission start symbol information included in DCI for scheduling PUSCH transmission, and for a PUSCH transmission end symbol in a last slot from among the PUSCH transmission slots, a PUSCH transmission time resource domain is determined according to PUSCH transmission end symbol information or PUSCH transmission length information included in the DIC that schedules PUSCH transmission, and PUSCH transmission is performed by using all symbols between the start symbol of the first slot and the end symbol of the last slot from among the PUSCH transmission slots.

In Method 6, when the terminal does not receive or does not know slot format indicator information for scheduled or configured PUSCH transmission slots, the terminal determines a PUSCH transmission time resource domain by applying time resource domain information included in DCI for scheduling PUSCH transmission to a first slot and a last slot from among the PUSCH transmission slots and determines, as PUSCH transmission time domain information, a symbol configured as an uplink symbol in remaining slots other than the first slot and the last slot from among the slots scheduled for PUSCH transmission.

Referring to b of FIG. 9, the terminal determines PUSCH transmission start symbol information of the first slot i+K1 905 of the slots i+K1 905, i+K1+1 906, i+K1+N1−1 907, and i+K1+N1 908 configured for PUSCH transmission by using PUSCH transmission start symbol information in the time domain resource allocation information 915 included in the DCI for scheduling PUSCH transmission, and determines PUSCH end symbol information from among PUSCH transmission resources of the last slot i+K1+N1 908 by using PUSCH transmission length or transmission end symbol information in the time domain resource allocation information 915 included in the DCI for scheduling PUSCH transmission.

In other words, regarding the PUSCH 940 in the first slot i+K1 905 from among the slots scheduled for PUSCH transmission, the PUSCH transmission start symbol information indicated by the DCI for scheduling PUSCH transmission (e.g., PUSCH transmission from a second symbol of the slot i+K1 905) to a last symbol are time resource domains of the PUSCH 940 in the slot 905. Also, regarding the PUSCH 941 in the slot i+K1+1 906 scheduled for PUSCH transmission, the terminal determines that all symbols of the slot i+K1+1 906 are time resource domains of the PUSCH 941.

In some embodiments, the terminal may determine that a symbol configured as an uplink symbol through a higher layer signal from among symbols of the slot i+K1+1 906 is a time resource domain of the PUSCH 941. Also, regarding the PUSCH 942 in the slot i+K1+N1−1 907 scheduled for PUSCH transmission, the terminal may determine that all symbols of the slot i+K1+N1−1 907 are time resource domains of the PUSCH 942. In this case, the terminal may determine that a symbol configured as an uplink symbol through a higher layer signal from among symbols of the slot i+K1+N1−1 906 is a time resource domain of the PUSCH 942.

Also, regarding the PUSCH 943 in the slot i+K1+N1 908 scheduled for PUSCH transmission, the terminal may determine that a first symbol of the slot i+K1+N1 908 to an end symbol determined through a PUSCH transmission length or a PUSCH transmission end symbol indicated in the DCI for scheduling PUSCH transmission are time resource domains of the PUSCH 943. In some embodiments, the terminal may determine that a first symbol to an end symbol determined through a PUSCH transmission length or a PUSCH transmission end symbol indicated by the DCI for scheduling PUSCH transmission from among symbols configured as uplink symbols through a higher layer signal from among symbols of the slot i+K1+N1 907 are time resource domains of the PUSCH 943. In Method 6, when the terminal does not receive or does not know slot format indicator information for scheduled or configured PUSCH transmission slots, because an unlicensed band is continuously used by applying time resource domain information included in DCI for scheduling PUSCH transmission to a first slot and a last slot of N1 PUSCH transmission slots, the terminal connected to an unlicensed band through a channel access procedure may use the unlicensed band without performing an additional channel access procedure.

Embodiment 7

The present embodiment provides a method of determining a PDSCH/PUSCH resource domain, in a base station and a terminal operating in an unlicensed band. In particular, the present embodiment provides a method of determining a PDSCH/PUSCH resource domain in a terminal or a base station that receives information on a channel occupancy time, for example, a slot format indicator, transmitted from the base station or the terminal after starting PDSCH reception or PUSCH transmission.

Figure 10:
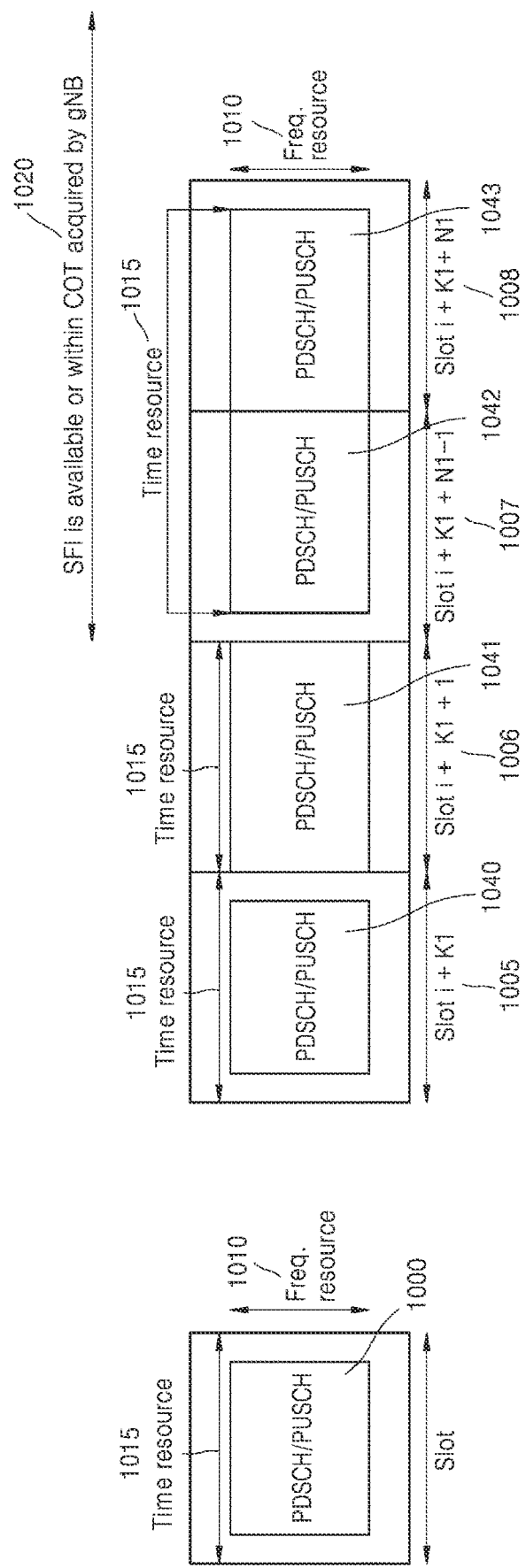
FIG. 10 is a diagram for describing a method of determining a resource domain, according to some embodiments of the present disclosure.

This will be described with reference to FIG. 10.

When the terminal does not receive or does not know slot format indicator information for N1 scheduled or configured PUSCH transmission slots, the terminal may determine a PUSCH transmission time domain resource for a slot scheduled for PUSCH transmission through a method of Embodiment 5 or Embodiment 6.

A method of determining a PUSCH transmission time domain resource through the method of Embodiment 5 is as follows. When the terminal scheduled for PUSCH (1040, 1041, 1042, 1043) transmission in slots i+K1 1005, i+K1+1 1006, i+K1+N1−1 1007, and i+K1+N1 1008 does not receive slot format indicator information for each slot, the terminal may determine time resource domains of the PUSCHs 1040, 1041, 1042, and 1043 by using information of a time resource domain 1015 included in DCI scheduled for PUSCH transmission as in Embodiment 5 or a of FIG. 9.

When the terminal receives a slot format indicator 1020 for some of slots scheduled for PUSCH transmission after starting scheduled PUSCH transmission for example, when the terminal receives information of the slot format indicator 1020 including slot format indicators for the slots i+K1+N1−1 1007 and the slot i+K1+N1 1008 in the slot i+K1+N1−1 1007, the terminal may change or adjust a pre-determined PUSCH transmission time resource domain by determining a PUSCH transmission time resource domain in the slots i+K1+N1−1 1007 and the slot i+K1+N1 1008 according to Embodiment 1, Embodiment 2, Embodiment 3, or Embodiment 4, or a combination thereof. In FIG. 10, a PUSCH transmission time resource domain in the slots i+K1+N1−1 1007 and the slot i+K1+N1 1008 is changed by using Embodiment 2 of the present disclosure.

In some embodiments, regarding change or adjustment of a PUSCH transmission time resource domain for a received slot format indicator, a PUSCH transmission time resource domain change or adjustment time or adjustment slot may be determined according to a time required for the base station or the terminal to receive a slot format indicator and decode and obtain slot format indicator information and a minimum processing time required for the base station or the terminal to change a PUSCH transmission time resource domain by using the obtained slot format indicator information.

For example, the terminal may consider a minimum processing time N2 required for the terminal to receive DCI for scheduling PUSCH transmission from the base station and start PUSCH transmission, and may change a PUSCH transmission time resource domain by using obtained slot format indicator information for PUSCH transmission transmitted after the time N2 from a last symbol of a PDCCH through which a slot format indicator is transmitted. In this case, for PUSCH transmission transmitted within the time N2 from the last symbol of the PDCCH through which the slot format indicator is transmitted, the terminal may perform PUSCH transmission by using a PUSCH resource domain determined by using a PUSCH transmission time resource domain of the DCI such as a pre-determined PUSCH transmission time resource domain (e.g., for the PUSCH 1042 in the slot i+K1+N1−1 1007, the PUSCH 942 in the slot i+K1+N1−1 907 of a of FIG. 9).

Embodiment 8

The present embodiment provides a method of determining a PDSCH/PUSCH resource domain, in a base station and a terminal operating in an unlicensed band. In particular, the present embodiment provides a method of determining a PDSCH/PUSCH resource domain when only slot format indicator information for some of slots scheduled for PDSCH reception or PUSCH transmission is received or known.

Figure 11:
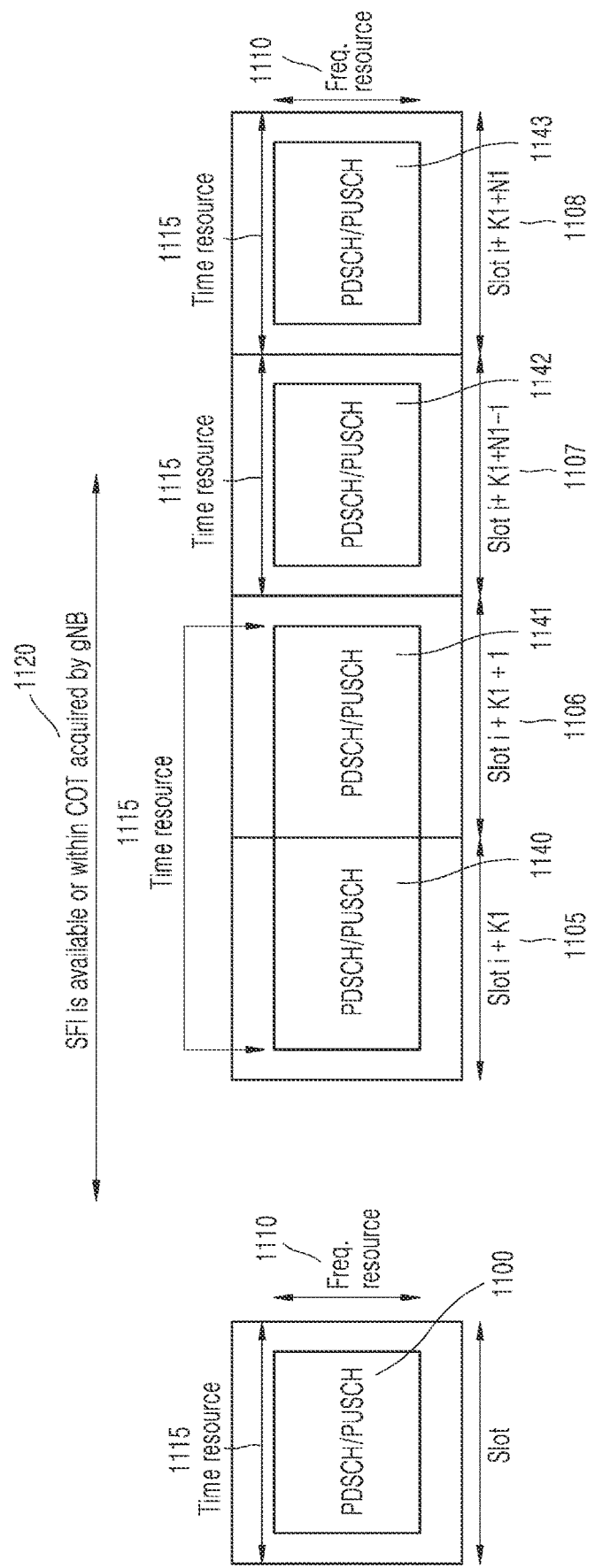
FIG. 11 is a diagram for describing a method of determining a resource domain, according to some embodiments of the present disclosure.

This will be described with reference to FIG. 11.

When the terminal does not receive or does not know slot format indicator information for at least one of scheduled or configured N1 PUSCH transmission slots, the terminal may determine a PUSCH transmission time domain resource through at least one of methods of Embodiment 1 through Embodiment 4 or a combination thereof for a slot whose slot format indicator information is received or known from among slots scheduled for PUSCH transmission, and may determine a PUSCH transmission time domain resource through any of methods of Embodiment 5 and Embodiment 6 or a combination thereof for a slot whose slot format indicator information is not received or not known from among the slots scheduled for PUSCH transmission.

A method of determining a PUSCH transmission time domain resource through the method of Embodiment 2 is as follows. When the terminal scheduled for PUSCH (1140, 1141, 1142, 1143) transmission in slots i+K1 1105, i+K1+1 1106, i+K1+N1−1 1107, and i+K1+N1 1108 does not receive slot format indicator information for some slots 1107 and 1108 from among the slots, the terminal may determine time resource domains of the PUSCHs 1042 and 1043 by using information of a time resource domain 1115 included in DCI for scheduling PUSCH transmission as in Embodiment 5 or a of FIG. 9 for the slots 1107 and 1108.

For slots, for example, the slots i+K1 1105 and i+K1+1 1106, whose slot format indicator 1120 is received from among slots scheduled for PUSCH transmission, the terminal may change or adjust a pre-determined PUSCH transmission time resource domain by determining a PUSCH transmission time resource domain in the slots i+K1 1105 and i+K1+1 1106 through Embodiment 1, Embodiment 2, Embodiment 3, or Embodiment 4, or a combination thereof. In FIG. 11, a PUSCH transmission time resource domain in the slots i+K1 1105 and i+K1+1 1106 is changed by using Embodiment 2 of the present disclosure.

Embodiment 9

The present embodiment provides another method of determining a PDSCH/PUSCH resource domain, in a base station and a terminal operating in an unlicensed band. In particular, a terminal or a base station receiving information on a channel occupancy time, for example, a slot format indicator, transmitted from the base station or the terminal differently determines a PDSCH/PUSCH according to a performed channel access procedure.

The terminal scheduled for PUSCH transmission through an unlicensed band performs a channel access procedure for the unlicensed band at a scheduled PUSCH transmission start time. In this case, the channel access procedure performed by the terminal may be included in DCI for scheduling PUSCH transmission and may be indicated by the base station.

For example, a field indicating whether the channel access procedure which the terminal has to use during PUSCH transmission is a Type 1 channel access procedure or a Type 2 channel access procedure may be included in the DCI, and a channel access procedure type may be indicated through the field to the terminal. In some embodiments, when PUSCH transmission of the terminal is performed within a channel occupancy time or interval of the base station, the terminal may perform a channel access procedure (e.g., a Type 2 or Type 3 channel access procedure) that is pre-defined independently from the channel access procedure type indicated through the DCI.

FIG. 6 illustrating Embodiment 2 will be described as follows. When the terminal does not know slot format indicator information for the slots 605, 606, 607, and 608 configured for PUSCH transmission at a time when DCI for scheduling PUSCH transmission is received and determines a scheduled PUSCH (640, 641, 642, 643) time resource domain through information of the PUSCH time domain resource 615 included in the DCI and an allocation method of a of FIG. 4 or b of FIG. 4, the terminal indicated through the DCI to perform the Type 1 channel access procedure may transmit a PUSCH by using a pre-configured PUSCH transmission time domain resource (a resource domain as in b of FIG. 4) even when receiving slot format indicator information for the slots 605, 606, 607, and 608 configured for PUSCH transmission before a scheduled PUSCH transmission time or before a minimum processing time N2 (e.g., slot i+K1−N2 or earlier) required for the terminal to receive a PDCCH and transmit a PUSCH based on the scheduled PUSCH transmission time.

In other words, the terminal that performs PUSCH transmission through the Type 1 channel access procedure may assume a PUSCH transmission time domain resource allocation and may perform PUSCH transmission regardless of whether slot format indicator information is received or as in the case of not receiving slot format indicator information.

Also, in some embodiments, it is assumed that a method of determining a PDSCH/PUSCH resource domain for at least one slot by using slot format indicator information in various embodiments of the present disclosure determines or changes a PDSCH/PUSCH resource domain in consecutive symbols. For example, a downlink symbol or a flexible symbol exists between consecutive uplink symbols in a slot as shown in format 50 or 56 of Table 3. When a downlink symbol exists between uplink symbols of a slot as shown in format 50 or 56 of Table 3 or a PUSCH resource domain is determined in consideration of only uplink symbols (in other words, when PUSCH transmission is not performed in a flexible symbol), PUSCH transmission in the slot is not performed. In other words, PUSCH transmission in the slot is dropped or cancelled. When a flexible symbol exists between uplink symbols of a slot, a PUSCH resource domain may be determined by considering both the flexible symbol and the uplink symbols. Even when only the uplink symbols are considered to determine a PUSCH transmission resource, a PUSCH resource domain may be determined by considering both the flexible symbol and the uplink symbols.

Also, in a method of determining or changing a PDSCH/PUSCH resource domain for at least one slot by using slot format indicator information in various embodiments of the present disclosure, a transport block size (TBS) may be determined according to the determined or changed PDSCH/PUSCH resource domain, or the TBS determined based on a time when PDSCH/PUSCH scheduling DCI is received may be maintained.

In an NR system, the base station may transmit data by allocating frequency resources of a certain number of PRBs and time resources of a certain number of slots or symbols to the terminal, and scheduling information may be transmitted to the terminal through downlink control information (DCI), a configuration transmitted through higher layer signaling, or a combination thereof. When scheduling information of the base station and the terminal is given, the TBS may be determined in the following order.

Step 1-1: Process of determining the number of temporary information bits (A)

Step 1-2: Process of determining the number of temporary CBs, performing byte alignment (making A a multiple of 8), and making A a multiple of the number of temporary CBs (C, B)

Step 1-3: Process of determining a TBS except for the number of CRC bits (TBS)

In Step 1-1, a temporary TBS value is determined in consideration of the number of resource domains to which data to be transmitted may be mapped. The number of temporary information bits may be determined by a combination of one or more of a code rate (R), a modulation order (Qm), the number of REs to which data is mapped through rate matching, the number of allocated PRBs or RBs (#PRB), the number of allocated OFDM symbols, the number of allocated slots, and a reference value of the number of mapped REs within one PRB.

For example, A may be determined by using A=NRE× Qm×R×v. The modulation order $Q_m$ and the code rate R may be included in DCI and may be transmitted to the terminal. The number v of layers used for transmission may be transmitted to the terminal through the DCI, higher layer signaling, or a combination thereof. $N_{RE}$ may be determined by the base station by using the number of REs to which data is mapped through rate matching when data is transmitted, and may be equally understood by the base station and the terminal when both the base station and the terminal know resource allocation information. When $N_{RE}$ is calculated, data is mapped by using a rate matching method, but data may be punctured for a special reason such as CSI-RS or URLLC or UCI transmission, and thus an RE that is not actually mapped may be included in $N_{RE}$. This is to make both the base station and the terminal equally understand the TBS even when the base station does not transmit some data scheduled to be mapped in a puncturing scheme without informing the terminal thereof.

In some embodiments, the base station may transmit information on $Q_m$ and R by transmitting an MCS index to the terminal through a defined MCS table. The modulation order refers to information such as QPSK, 16 QAM, 64 QAM, 256 QAM, or 1024 QAM, and $Q_m$=2 for QPSK, $Q_m$=4 for 16 QAM, $Q_m$=6 for 64 QAM, $Q_m$=8 for 256 QAM, and $Q_m$=10 for 1024 QAM. That is, $Q_m$ may refer to the number of bits that may be transmitted in a modulated symbol. In this case, $Q_m$ and R may be transmitted together through an MCS index, or each of $Q_m$ and R may be transmitted in a bit field Alternatively, A=(number of allocated PRBs)×(number of reference REs per PRB)×$Q_m$×R×v.

Step 1-2 is a step of determining the number C of temporary code blocks (temporary CBs) by using determined A, and making A a multiple of both 8 and the number of temporary CBs. This is to make the finally determined TBS and the length of the CRC added to the TB byte-aligned and also a multiple of CBs. Step 1-3 is a process of excluding the number of bits added for the CRC from the obtained information bits to be transmitted.

Accordingly, when a PUSCH transmission time domain resource is changed through various embodiments of the present disclosure, the number of $N_{RE}$ may be changed in a TBS determination method, and thus the TBS may be changed or re-determined. FIG. 6 illustrating Embodiment 2 will be described as follows.

When the terminal does not know slot format indicator information for the slots 605, 606, 607, and 608 configured for PUSCH transmission at a time when DCI for scheduling PUSCH transmission is received, the terminal may be calculate $N_{RE}$ and may calculate a TBS by using information of a PUSCH time domain resource 615 included in the DCI, an allocation method as in a or b of FIG. 4, and, when there exists uplink-downlink configuration information configured through a higher layer signal, the configuration information.

For example, when the terminal is defined or configured from the base station to use an allocation method as in a of FIG. 4, the terminal may calculate $N_{RE}$ and a TBS in the slots 605, 606, 607, and 608 configured for PUSCH transmission by using allocation information of the time domain resource 615 included in the DCI. When the terminal receives slot format indicator information for the slots 605, 606, 607, and 608 configured for PUSCH transmission before a scheduled PUSCH transmission time or before a minimum processing time N2 (e.g., slot i+K1−N2 or earlier) required for the terminal to receive a PDCCH and transmit a PUSCH based on the scheduled PUSCH transmission time, the terminal may assume PUSCH transmission time domain resource allocation such as PUSCH (640, 641, 642, 643) transmission time domain resource allocation of FIG. 6 and may calculate (or change or re-calculate) a TBS. When the terminal receives slot format indicator information for the slots 605, 606, 607, and 608 configured for PUSCH transmission before a scheduled PUSCH transmission time or within a minimum processing time N2 (e.g., within slot i+K1 from slot i+K1-N2) required for the terminal to receive a PDCCH and transmit a PUSCH based on the scheduled PUSCH transmission time, the terminal may use $N_{RE}$ and a TBS calculated by using the allocation information of the time domain resource 615 included in the DCI.

Another TBS calculation method by which a PUSCH transmission time domain resource is changed and a TBS is changed or re-determined through various embodiments of the present disclosure is as follows. When a PUSCH transmission time domain resource is changed and a TBS is changed or re-determined, because the terminal has to perform data processing (e.g., data encoding or resource mapping) again, overhead of the terminal may be increased. Accordingly, in order to prevent an unnecessary increase in overhead of the terminal, regardless of whether a PUSCH transmission time domain resource is changed, the terminal may use $N_{RE}$ and a TBS calculated by using allocation information of a time domain resource 615 included in DCI.

However, when the terminal transmits the TBS calculated by using the allocation information of the time domain resource 615 included in the DCI through a changed PUSCH transmission time domain resource, an actual data code rate may be so high that the base station may not perform decoding. For example, when the number of symbols or the allocation information of the time domain resource 615 included in the DCI is greater than the number of symbols or changed PUSCH transmission time domain resource, and the calculated TBS is transmitted the changed PUSCH transmission time domain, a data code rate is increased. In this case, the terminal may map data based on the allocation information of the time domain resource 615 included in the DCI, and may puncture and may not transmit resources or symbols other than the changed PUSCH transmission time domain resource.

Another TBS calculation method by which a PUSCH transmission time domain resource is changed and a TBS is changed or re-determined through various embodiments of the present disclosure is as follows. When a PUSCH transmission time domain resource is changed but a TBS is not changed, a code rate of received data is increased, and thus data may not be correctly received. Accordingly, a case where a PUSCH transmission time domain resource varies according to information such as a slot format indicator in various embodiments of the present disclosure may be restricted so that PUSCH transmission time domain resource change according to an embodiment of the present disclosure is applied only when the number of allocated symbols or time domain resource allocation information included in DCI scheduled for PDSCH/PUSCH transmission/reception of the terminal is equal to or less than the number of allocated symbols or PUSCH transmission time domain resources changed by the information such as the slot format indicator. When the number of allocated symbols or time domain resource allocation information included in the DCI scheduled for PDSCH/PUSCH transmission/reception of the terminal is greater than the number of allocated symbols or PUSCH transmission time domain resources changed by the information such as the slot format indicator, the terminal performs TBS determination and PUSCH transmission by using the time domain resource allocation information included in the DCI.

According to the present disclosure, because, in a wireless communication system, in particular, in a system and a node that transmits/receives a signal through an unlicensed band, a downlink signal reception resource domain or an uplink transmission resource domain is determined by using scheduling information and slot structure information received from the node connected to the unlicensed band through a channel access procedure, the unlicensed band may be more efficiently used.

Figure 12:
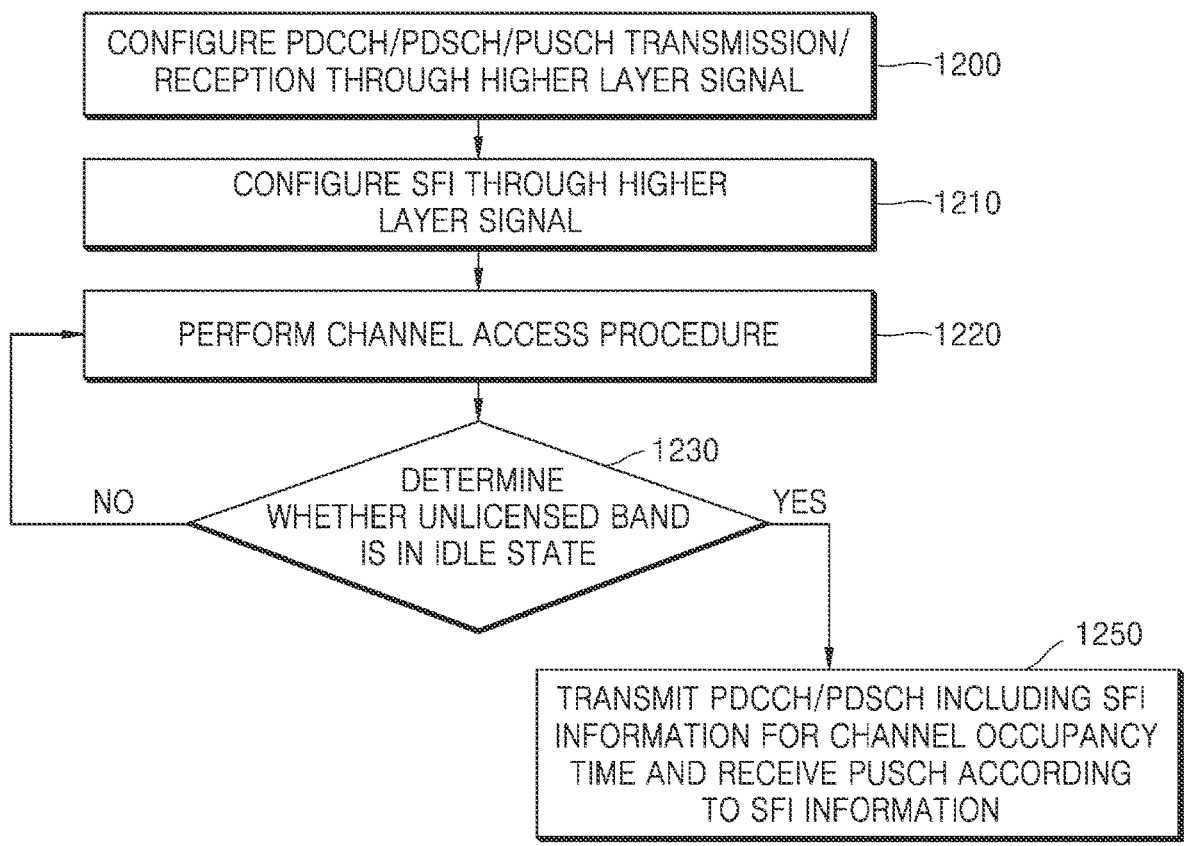
FIG. 12 is a flowchart illustrating an operation of a base station, according to some embodiments of the present disclosure.

An operation of a base station according to an embodiment of the present disclosure will be described with reference to FIG. 12.

In operation 1200, a base station may transmit a configuration for PDCCH, PDSCH, and PUSCH transmission/reception to a terminal through a higher layer signal. For example, the base station may transmit a PDCCH resource domain for receiving downlink or uplink scheduling information, a CORESET configuration, or a search space configuration to the terminal through a higher layer signal. Also, the base station may transmit a configuration for PDSCH/PUSCH transmission/reception including offset information between a PDCCH reception slot and a PDSCH reception slot or a PUSCH transmission slot, and information on the number of times a PDSCH or a PUSCH is repeatedly transmitted to the terminal through a higher layer signal. In operation 1210, the base station may additionally transmit slot format indicator-related configuration information such as slot format indicator format information and a slot format indicator transmission period. In this case, the slot format indicator-related configuration information transmitted to the terminal in operation 1210 may be transmitted in operation 1200. When the base station is to transmit a signal in an unlicensed band, in operation 1220, the base station may determine whether the unlicensed band is in an idle state by performing a channel access procedure for the unlicensed band. When it is determined in operation 1220 that the unlicensed band is not in the idle state, the base station may continue or restart the channel access procedure for the unlicensed band in operation 1220. When it is determined in operation 1220 that the unlicensed band is in the idle state, the base station may transmit, through the unlicensed band, DCI for scheduling PDSCH reception or PUSCH transmission of the terminal including channel occupancy time information or corresponding slot format indicator information in operation 1250, and may receive uplink data information of the terminal in a PUSCH resource domain determined through various embodiments of the present disclosure according to scheduling and slot format indicator information of the DCI.

Figure 13:
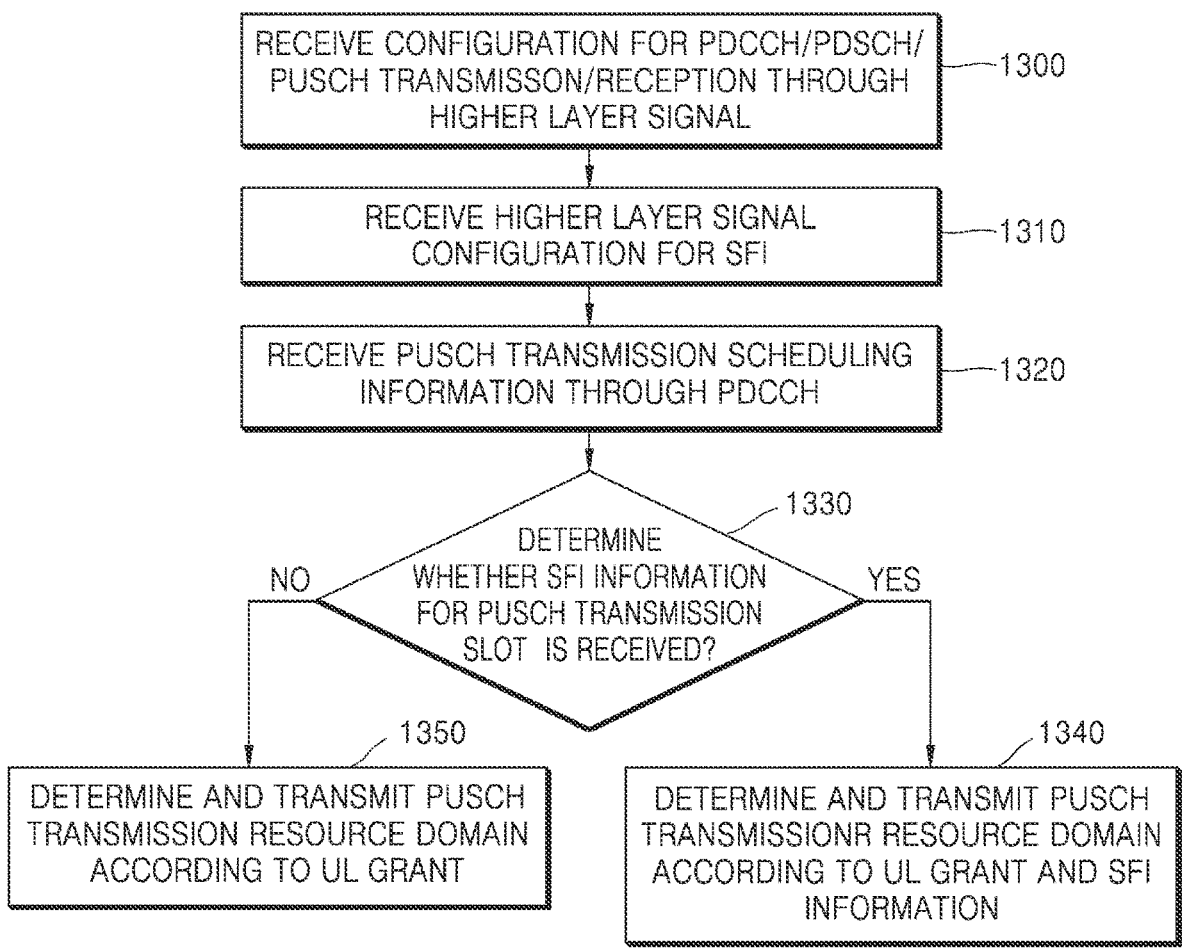
FIG. 13 is a flowchart illustrating an operation of a terminal, according to some embodiments of the present disclosure.

An operation of a terminal according to an embodiment of the present disclosure will be described with reference to FIG. 13.

Figure 14:
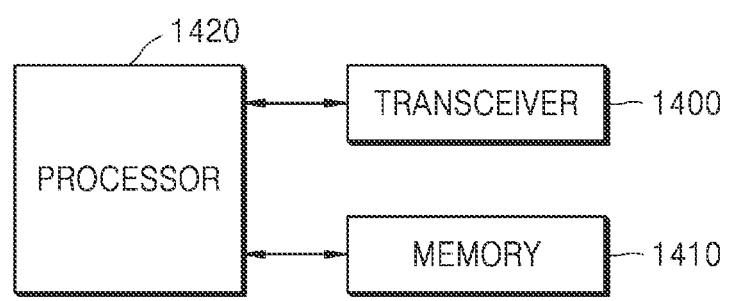
FIG. 14 is a block diagram illustrating a structure of a base station according to some embodiments of the present disclosure.

In operation 1300, a terminal receives a configuration for PDCCH, PDSCH, and PUSCH transmission/reception through a higher layer signal from a base station, and configures PDCCH, PDSCH, and PUSCH transmission/reception according to received configuration information. For example, the terminal may receive a PDCCH resource domain for receiving downlink or uplink scheduling information from the base station, a CORESET configuration, or a search space configuration through a higher layer signal. Also, the terminal may receive a configuration for PDSCH/PUSCH transmission/reception including offset information between a PDCCH reception slot and a PDSCH reception slot or a PUSCH transmission slot, and information on the number of times a PDSCH or a PUSCH is repeatedly transmitted through a higher layer signal from the base station. In operation 1310, the terminal may additionally receive slot format indicator-related configuration information such as slot format indicator format information and a slot format indicator transmission period. In this case, the slot format indicator-related configuration information in operation 1310 may be included in the higher layer signal configuration information transmitted in operation 1300. When the terminal is scheduled for PUSCH transmission through an unlicensed band in operation 1320 and receives or knows slot format indicator information for the PUSCH transmission slot in operation 1330, the terminal determines a PUSCH transmission time resource domain according to one or a combination of various embodiments of the present embodiment in operation 1340, and transmits a PUSCH through a determined PUSCH transmission resource to the base station. When the terminal does not receive or does not know slot format indicator information for the PUSCH transmission slot in operation 1330, the terminal determines a PUSCH transmission time resource domain according to one or a combination of various embodiments of the present embodiment in operation 1350, and transmits a PUSCH through a determined PUSCH transmission resource to the base station. For example, in operation 1350, the terminal determines a PUSCH transmission time resource domain included in scheduling DCI as the PUSCH transmission time resource, and transmits a PUSCH through the determined PUSCH transmission resource to the base station. As described in the above embodiments, the terminal may communicate with the base station by determining a PDSCH transmission resource domain. In detail, FIG. 14 is a block diagram illustrating an internal structure of a base station according to an embodiment of the present disclosure. As shown in FIG. 14, a base station of the present disclosure may include a transceiver 1400, a memory 1410, and a processor 1420. The processor 1420, the transceiver 1400, and the memory 1410 may operate according to a communication method of the base station. However, elements of the base station are not limited thereto. For example, the base station may include more or fewer elements than those illustrated in FIG. 14. Also, the processor 1420, the transceiver 1400, and the memory 1410 may be implemented as one chip. Also, the processor 1420 may include at least one processor.

A base station receiver and a base station transmitter are collectively referred to as the transceiver 1400, and the transceiver 1400 may transmit/receive a signal to/from a terminal. The signal transmitted/received to/from the terminal may include control information and data. The transceiver 1400 may include a radio frequency (RF) transmitter that up-coverts and amplifies a frequency of a transmitted signal, and an RF receiver that performs low-noise amplification on a received signal and down-converts a frequency. However, the transceiver 1400 is merely an example, and elements of the transceiver 1400 are not limited to the RF transmitter and the RF receiver. Also, the transceiver 1400 may receive a signal through a wireless channel and may output a signal to the processor 1420, and may transmit a signal output from the processor 1420 through the wireless channel.

The processor 1420 may control a series of processes so that the base station operates according to the embodiments of the present disclosure. For example, the transceiver 1400 may receive a data signal including a control signal transmitted by the terminal, and the processor 1420 may determine a reception result for the data signal and the control signal transmitted by the terminal. Also, the processor 1420 may perform a channel access procedure for an unlicensed band. For example, the transceiver 1400 may receive signals transmitted through the unlicensed band, and the processor 1420 may determine whether the unlicensed band is in an idle state by comparing an intensity of a signal received by the processor 1420 with a threshold value that is predefined or is determined from a value of a function having a bandwidth as a factor. Also, the processor 1420 may maintain or change a contention window value for the channel access procedure according to the reception result of the data signal of the terminal received by the transceiver 1400. When it is determined that the unlicensed band is in the idle state, a downlink signal including slot format indicator information may be transmitted through the transceiver 1400. In this case, the transceiver 1400 may transmit information on an uplink or downlink transmission interval within a channel occupancy interval of the unlicensed band determined by the processor 1420 to the terminal. Also, the base station may receive a PUSCH transmitted by the terminal through the transceiver 1400 in a PUSCH transmission resource domain determined according to slot format indicator information and PDSCH/PUSCH scheduling information.

Also, the processor 1420 may perform a series of operations for allocating a resource domain in a wireless communication system and providing information on the allocated resource domain to the terminal according to an embodiment of the present disclosure. That is, the processor 1420 may control other elements of the base station to perform higher layer signal transmission, SFI transmission, DCI transmission, and channel access procedure.

The memory 1410 may store a program and data required to operate the base station. Also, the memory 1410 may store control information or data included in a signal obtained by the base station. The memory 1410 may include a storage medium such as a read-only memory (ROM), a random-access memory (RAM), a hard disk, a compact disk (CD)-ROM, or a digital versatile disk (DVD), or a combination thereof.

Figure 15:
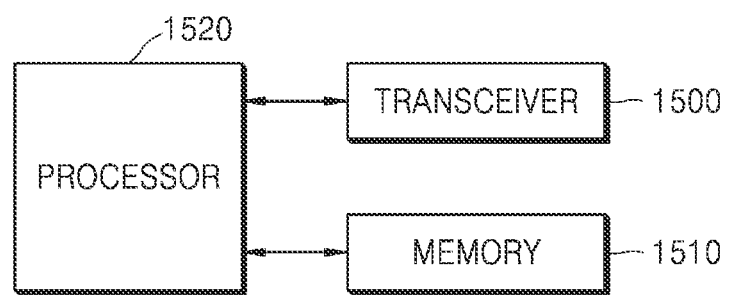
FIG. 15 is a block diagram illustrating a structure of a terminal according to some embodiments of the present disclosure.

FIG. 15 is a block diagram illustrating an internal structure according to an embodiment of the present disclosure. As shown in FIG. 15, a terminal according to the present disclosure may include a transceiver 1500, a memory 1510, and a processor 1520.

The processor 1520, the transceiver 1500, and the memory 1510 may operate according to a communication method of the terminal. However, elements of the terminal are not limited thereto. For example, the terminal may include more or fewer elements than those illustrated in FIG. 15. Also, the processor 1520, the transceiver 1500, and the memory 1510 may be implemented as one chip. Also, the processor 1520 may include at least one processor.

A terminal receiver and a terminal transmitter may be collectively referred to as the transceiver 1500. The transceiver 1500 may transmit/receive a signal to/from a base station. The signal transmitted/received to/from the base station may include control information and data. To this end, the transceiver 1500 may include an RF transmitter that up-coverts and amplifies a frequency of a transmitted signal, and an RF receiver that performs low-noise amplification on a received signal and down-converts a frequency. However, the transceiver 1500 is merely an example, and elements of the transceiver 1500 are not limited to the RF transmitter and the RF receiver. Also, the transceiver 1500 may receive a signal through a wireless channel and may output a signal to the processor 1520, and may transmit a signal output from the processor 1520 through the wireless channel.

The processor 1520 may control a series of processes so that the terminal operates according to the embodiments of the present disclosure. For example, the transceiver 1500 may receive a data signal including a control signal, and the processor 1520 may determine a reception result for the data signal. Next, when a first signal reception result including data reception at a certain timing needs to be transmitted to the base station, the transceiver 1500 may transmit the first signal reception signal to the base station at a timing determined by the processor 1520. Also, when the transceiver 1500 receives, from the base station, information on an uplink or downlink transmission interval within a channel occupancy interval of an unlicensed band, the processor 1520 may re-configure or change a downlink control channel transmission time or period of the terminal, or the terminal may re-configure or change time domain allocation information of a scheduled uplink data channel, and thus the transceiver 1500 may receive a downlink control channel transmitted by the base station. Also, the terminal may receive a reception result for uplink data transmitted by the transceiver 1500 from the base station, and the processor 1520 may maintain or change a size of a contention window used in a channel access procedure for unlicensed band signal transmission according to the received result. Also, the transceiver 1500 of the terminal may receive slot format indicator information transmitted by the base station, and the processor 1520 may re-configure or change the time domain allocation information of the scheduled uplink data channel according to the received slot format indicator information.

Also, the processor 1520 may obtain configuration information for control channel and data channel transmission/reception according to an embodiment of the present disclosure, and may obtain DCI including transmission slot scheduling information of a data channel such as a PUSCH or a PDSCH through a PDCCH based on the configuration information. Also, the processor 1520 may determine whether a slot format indicator for a PUSCH or PDSCH transmission slot is received, may determine a resource domain of the PUSCH or PDSCH transmission slot according to the slot format indicator or the DCI based on whether the slot format indicator is received or determine a resource domain of the PUSCH or PDSCH transmission slot according to the DCI or a pre-configured method, and may control other elements of the terminal to communicate data by using the determined resource domain.

The memory 1510 may store a program and data required to operate the terminal. Also, the memory 1510 may store control information or data included in a signal obtained by the terminal. The memory 1510 may include a storage medium such as a ROM, a RAM, a hard disk, a CD-ROM, or a DVD, or a combination thereof.

Meanwhile, the embodiments disclosed in the specification and drawings are merely presented to easily describe the technical content of the present disclosure and help understanding of the present disclosure, and are not intended to limit the scope of the present disclosure. That is, it will be obvious to one of ordinary skill in the art to which the present disclosure belongs that different modifications may be achieved based on the technical spirit of the present disclosure. Also, when necessary, the above respective embodiments may be employed in combination. For example, parts of methods provided by the present disclosure may be combined to operate the base station and the terminal. Also, although the above embodiments have been presented with reference to 5G and NR systems, other modifications based on the technical idea of the embodiments may also be implemented in connection with other systems such as LTE, LTE-A, and LTE-A-Pro systems.

The invention claimed is:

1. A method of performing communication by a terminal according to an allocated resource domain in a wireless communication system, the method comprising:
obtaining configuration information for control channel and data channel transmission and reception;

obtaining downlink control information (DCI) comprising slot scheduling information for a plurality of physical uplink shared channels (PUSCHs) on unlicensed spectrum and at least one slot format indicator corresponding to a plurality of PUSCH transmission slots, based on the configuration information;

identifying at least one uplink symbol allocated for transmission of uplink data in the plurality of PUSCH transmission slots based on the at least one slot format indicator and the slot scheduling information in the DCI; and transmitting the uplink data on the at least one uplink symbol.

2. The method of claim 1, wherein the slot scheduling information of the DCI comprises at least one of information on a number of the plurality of PUSCH transmission slots, offset information of the plurality of PUSCH transmission slots, and information on a time resource domain allocated for PUSCH transmission and a frequency resource domain allocated for PUSCH transmission.

3. The method of claim 1,
further comprising:
identifying a flexible symbol of the plurality of PUSCH transmission slots based on the at least one slot format indicator.

4. The method of claim 1, wherein the identifying of the at least one uplink symbol comprises:
identifying a PUSCH transmission start symbol of a first PUSCH transmission slot and a PUSCH transmission end symbol of a last PUSCH transmission slot from among the plurality of PUSCH transmission slots based on the slot scheduling information, and
identifying at least one uplink symbol of remaining PUSCH transmission slots based on the at least one slot format indicator.

5. The method of claim 1, wherein the identifying of the at least one uplink symbol comprises:
identifying a PUSCH transmission start symbol of a first PUSCH transmission slot from among the plurality of PUSCH transmission slots based on the slot scheduling information, and
identifying at least one uplink symbol of remaining PUSCH transmission slots based on the at least one slot format indicator.

6. The method of claim 1, wherein the identifying of the at least one uplink symbol, comprises identifying a PUSCH transmission start symbol and a PUSCH transmission end symbol of each of the plurality of PUSCH transmission slots based on the DCI.

7. The method of claim 1, wherein the identifying of the at least one uplink symbol, comprises:
identifying a PUSCH transmission start symbol of a first PUSCH transmission slot and a PUSCH transmission end symbol of a last PUSCH transmission slot from among the plurality of PUSCH transmission slots based on the DCI, and
identifying all symbols between the PUSCH transmission start symbol and the PUSCH transmission end symbol as resource domain allocated for transmission of the uplink data.

8. The method of claim 1, wherein the identifying of the at least one uplink symbol comprises identifying whether the at least one slot format indicator is used based on a channel access procedure type of the terminal.

9. A method of performing communication by a base station according to an allocated resource domain in a wireless communication system, the method comprising:

transmitting configuration information for control channel and data channel transmission and reception;

transmitting downlink control information (DCI) comprising slot scheduling information for a plurality of physical uplink shared channels (PUSCHs) on unlicensed spectrum and at least one slot format indicator corresponding to a plurality of PUSCH transmission slots, based on the configuration information; and receiving uplink data from a terminal on at least one uplink symbol allocated for transmission of uplink data in the plurality of PUSCH transmission slots based on the at least one slot format indicator and the slot scheduling information in the DCI.

10. A terminal for performing communication according to an allocated resource domain in a wireless communication system, the terminal comprising:
a transceiver; and
at least one controller coupled to the transceiver, and configured to:
obtain configuration information for control channel and data channel transmission and reception,
obtain downlink control information (DCI) comprising slot scheduling information for a plurality of physical uplink shared channels (PUSCHs) on unlicensed spectrum and at least one slot format indicator corresponding to a plurality of PUSCH transmission slots based on the configuration information,
identify at least one uplink symbol allocated for transmission of uplink data in the plurality of PUSCH transmission slots based on the at least one slot format indicator and the slot scheduling information in the DCI, and
transmit the uplink data on the at least one uplink symbol.

11. The terminal of claim 10, wherein the at least one controller is further configured to identify a flexible symbol of the plurality of PUSCH transmission slots based on the at least one slot format indicator.

12. The terminal of claim 10, wherein the at least one controller is further configured to:
identify a PUSCH transmission start symbol of a first PUSCH transmission slot and a PUSCH transmission end symbol of a last PUSCH transmission slot from among the plurality of PUSCH transmission slots based on the DCI slot scheduling information, and
identify at least one uplink symbol of remaining PUSCH transmission slots based on the at least one slot format indicator.

13. A base station for performing communication according to an allocated resource domain in a wireless communication system, the base station comprising:
a transceiver; and
at least one controller coupled to the transceiver, and configured to:
transmit configuration information for control channel and data channel transmission and reception,
transmit downlink control information (DCI) comprising slot scheduling information for a plurality of physical uplink shared channels (PUSCHs) on unlicensed spectrum and at least one slot format indicator corresponding to a plurality of PUSCH transmission slots based on the configuration information, and
receive uplink data from a terminal on at least one uplink symbol allocated for transmission of uplink data in the plurality of PUSCH transmission slots based on the at least one slot format indicator and the slot scheduling information in the DCI.

* * * * *